(12) United States Patent
Washingon et al.

(10) Patent No.: US 8,627,509 B2
(45) Date of Patent: Jan. 7, 2014

(54) SYSTEM AND METHOD FOR MONITORING CONTENT

(75) Inventors: Richard G. Washingon, Marble Falls, TX (US); Clifford L. Hall, III, Austin, TX (US)

(73) Assignee: RGB Networks, Inc., Sunnyvale, CA (US)

( * ) Notice: Subject to any disclaimer, the term of this patent is extended or adjusted under 35 U.S.C. 154(b) by 1438 days.

(21) Appl. No.: 11/772,582

(22) Filed: Jul. 2, 2007

(65) Prior Publication Data

US 2009/0013414 A1 Jan. 8, 2009

(51) Int. Cl.
*G06F 7/04* (2006.01)

(52) U.S. Cl.
USPC .......................................................... 726/32

(58) Field of Classification Search
USPC ...................... 726/22–24, 30–32; 705/51, 57; 380/201, 202; 713/170, 176
See application file for complete search history.

(56) References Cited

U.S. PATENT DOCUMENTS

| | | |
|---|---|---|
| 4,509,073 A | 4/1985 | Baran |
| 5,093,718 A | 3/1992 | Hoarty |
| 5,220,420 A | 6/1993 | Hoarty |
| 5,319,455 A | 6/1994 | Hoarty |
| 5,361,091 A | 11/1994 | Hoarty |
| 5,412,720 A | 5/1995 | Hoarty |
| 5,442,700 A | 8/1995 | Snell |
| 5,485,197 A | 1/1996 | Hoarty |
| 5,526,034 A | 6/1996 | Hoarty |
| 5,550,578 A | 8/1996 | Hoarty |
| 5,557,316 A | 9/1996 | Hoarty |
| 5,587,734 A | 12/1996 | Lauder |
| 5,594,507 A | 1/1997 | Hoarty |
| 5,812,665 A | 9/1998 | Hoarty |
| 5,822,537 A | 10/1998 | Katseff |
| 5,883,661 A | 3/1999 | Hoarty |
| 5,953,506 A | 9/1999 | Kalra |
| 6,034,678 A | 3/2000 | Hoarty |

(Continued)

FOREIGN PATENT DOCUMENTS

| | | |
|---|---|---|
| GB | 2369203 A | 5/2002 |
| WO | 99/07158 | 2/1999 |

(Continued)

OTHER PUBLICATIONS

U.S. Appl. No. 11/688,936 entitled, "System and Method for Identifying Content," filed Mar. 21, 2007, 61 pages.

(Continued)

*Primary Examiner* — Beemnet Dada
(74) *Attorney, Agent, or Firm* — Baker Botts L.L.P.

(57) ABSTRACT

A method for processing media files includes receiving a request to download a first media file and, in response to receiving the request, generating a first signature that describes a first characteristic of the first media file. The method also includes determining whether the first signature matches any of a first plurality of stored signatures. The method also includes generating a second signature that describes a second characteristic of the first media file in response to determining that the first signature matches one of the first plurality of stored signatures. Additionally the method includes determining whether the second signature matches any of a second plurality of stored signatures and, in response to determining that the second signature matches one or more of the second plurality of stored signatures, denying the request to download the first media file.

14 Claims, 6 Drawing Sheets

(56) References Cited

U.S. PATENT DOCUMENTS

| | | | |
|---|---|---|---|
| 6,055,315 A | 4/2000 | Doyle | |
| 6,064,377 A | 5/2000 | Hoarty | |
| 6,100,883 A | 8/2000 | Hoarty | |
| 6,177,931 B1 | 1/2001 | Alexander | |
| 6,205,582 B1 | 3/2001 | Hoarty | |
| 6,253,238 B1 | 6/2001 | Lauder | |
| 6,279,113 B1* | 8/2001 | Vaidya | 726/23 |
| 6,305,020 B1 | 10/2001 | Hoarty | |
| 6,345,279 B1 | 2/2002 | Li | |
| 6,407,680 B1 | 6/2002 | Lai | |
| 6,421,733 B1 | 7/2002 | Tso et al. | 709/246 |
| 6,490,627 B1 | 12/2002 | Kalra | |
| 6,498,897 B1 | 12/2002 | Nelson | |
| 6,510,513 B1 | 1/2003 | Danielli | 713/156 |
| 6,593,860 B2 | 7/2003 | Lai | |
| 6,757,429 B2 | 6/2004 | Hu | |
| 6,823,082 B2 | 11/2004 | Hu | |
| 6,888,477 B2 | 5/2005 | Lai | |
| 6,904,168 B1 | 6/2005 | Steinberg et al. | 382/165 |
| 6,938,157 B2 | 8/2005 | Kaplan | 713/176 |
| 6,963,972 B1 | 11/2005 | Chang | |
| 6,970,602 B1 | 11/2005 | Smith | |
| 7,088,823 B2* | 8/2006 | Fetkovich | 380/255 |
| 7,093,277 B2 | 8/2006 | Perlman | |
| 7,734,800 B2 | 6/2010 | Gupta | |
| 2001/0056460 A1 | 12/2001 | Sahota | |
| 2002/0006204 A1 | 1/2002 | England | |
| 2002/0087957 A1 | 7/2002 | Norris | |
| 2002/0120586 A1 | 8/2002 | Masaki | |
| 2002/0129140 A1 | 9/2002 | Peled et al. | |
| 2002/0131496 A1 | 9/2002 | Vasudevan | |
| 2002/0138848 A1 | 9/2002 | Alao | |
| 2002/0172418 A1 | 11/2002 | Hu | |
| 2002/0194227 A1 | 12/2002 | Day | |
| 2003/0004880 A1 | 1/2003 | Banerjee | |
| 2003/0037010 A1* | 2/2003 | Schmelzer | 705/67 |
| 2003/0053702 A1 | 3/2003 | Hu | |
| 2003/0061369 A1 | 3/2003 | Aksu | |
| 2003/0105739 A1* | 6/2003 | Essafi et al. | 707/1 |
| 2003/0158969 A1 | 8/2003 | Gimson | |
| 2003/0185395 A1* | 10/2003 | Lee et al. | 380/277 |
| 2003/0196206 A1 | 10/2003 | Shusman | |
| 2004/0003117 A1 | 1/2004 | McCoy | |
| 2004/0086039 A1 | 5/2004 | Reynolds | |
| 2004/0111476 A1 | 6/2004 | Trossen | |
| 2004/0133548 A1 | 7/2004 | Fielding et al. | |
| 2004/0133927 A1* | 7/2004 | Sternberg et al. | 725/136 |
| 2004/0139233 A1 | 7/2004 | Kellerman | |
| 2004/0193648 A1 | 9/2004 | Lai | |
| 2005/0004997 A1 | 1/2005 | Balcisoy | |
| 2005/0060411 A1 | 3/2005 | Coulombe | |
| 2005/0132264 A1 | 6/2005 | Joshi | |
| 2005/0172127 A1 | 8/2005 | Hartung | |
| 2005/0198210 A1 | 9/2005 | Janik | |
| 2005/0213826 A1 | 9/2005 | Neogi | |
| 2005/0265395 A1 | 12/2005 | Kim | |
| 2005/0273598 A1 | 12/2005 | Silverbrook et al. | 713/157 |
| 2005/0286497 A1 | 12/2005 | Zutaut | |
| 2006/0015649 A1 | 1/2006 | Zutaut | |
| 2006/0026302 A1 | 2/2006 | Bennett | |
| 2006/0117379 A1 | 6/2006 | Bennett | |
| 2006/0136457 A1 | 6/2006 | Park | |
| 2006/0167803 A1 | 7/2006 | Aydar et al. | 705/51 |
| 2006/0168227 A1 | 7/2006 | Levine | |
| 2006/0168323 A1 | 7/2006 | Kim | |
| 2006/0179472 A1 | 8/2006 | Chang | |
| 2006/0242318 A1 | 10/2006 | Nettle | |
| 2006/0265657 A1 | 11/2006 | Gilley | |
| 2007/0067725 A1 | 3/2007 | Cahill | |
| 2007/0124816 A1 | 5/2007 | Abigail | |
| 2007/0162945 A1 | 7/2007 | Mills | |
| 2007/0186005 A1 | 8/2007 | Setlur | |
| 2007/0255659 A1 | 11/2007 | Yen | |
| 2008/0016185 A1 | 1/2008 | Herberger | |
| 2008/0091845 A1 | 4/2008 | Mills | |
| 2008/0141303 A1 | 6/2008 | Walker | |
| 2008/0195698 A1 | 8/2008 | Stefanovic | |
| 2008/0195761 A1 | 8/2008 | Jabri | |
| 2008/0231480 A1 | 9/2008 | Lai | |
| 2008/0235200 A1 | 9/2008 | Washington et al. | |
| 2009/0083279 A1 | 3/2009 | Hasek | |
| 2009/0119322 A1 | 5/2009 | Mills | |
| 2009/0164601 A1 | 6/2009 | Swartz | |
| 2009/0232220 A1 | 9/2009 | Neff | |
| 2010/0070608 A1 | 3/2010 | Hosur | |
| 2010/0094931 A1 | 4/2010 | Hosur | |
| 2010/0185776 A1 | 7/2010 | Hosur | |

FOREIGN PATENT DOCUMENTS

| | | | | |
|---|---|---|---|---|
| WO | WO 02/082271 A1 | 10/2002 | | G06F 11/30 |
| WO | WO 03/032136 A1 | 4/2003 | | G06F 1/00 |
| WO | WO03032136 | * 4/2003 | | G06F 1/00 |
| WO | 03/073370 | 9/2003 | | |
| WO | 2004/077790 | 9/2004 | | |
| WO | WO 2005/006768 A1 | 1/2005 | | H04N 9/00 |
| WO | 2005/046140 | 5/2005 | | |
| WO | WO 2006/134310 A2 | 12/2006 | | |
| WO | 2007/053957 | 5/2007 | | |
| WO | 2007/063485 | 6/2007 | | |
| WO | 2009/024926 | 2/2009 | | |

OTHER PUBLICATIONS

PCT Notification of Transmittal of the International Search Report and the Written Opinion of the International Searching Authority, or the Declaration in International Application No. PCT/US2008/055079, dated Sep. 4, 2008, 12 pages.

Official Action in U.S. Appl. No. 11/688,936, dated Aug. 7, 2009, 38 pages.

Office Action for U.S. Appl. No. 12/578,773, Jun. 28, 2011.

"Akimbo adds RSS feeds to video-on-demand service," Online Reporter, No. 455, Aug. 6, 2005.

APEC eSecurity Task Group, "Guidelines to Issue Certificates Capable of Being Used in Cross Jurisdictional eCommerce," *APEC*, Dec. 2004.

Bezoza, Alan et al., "How the Internet Will Disrupt the Long-Term Video Value Chain," Friedman, Billings, Ramsey & Co., Inc., Oct. 6, 2005.

Färber, Nikolaus et al., "Adaptive progressive download based on the MPEG-4 file format," *Journal of Zhejiang University Science* A (Suppl I), 2006.

Kantarci, Aylin et al.; "Rate adaptive video streaming under lousy network conditions;" *Signal Processing: Image Communication 19*, Mar. 22, 2004.

PCT Notification of Transmittal of the International Search Report and the Written Opinion of the International Searching Authority, or the Declaration with attached PCT International Search Report and the Written Opinion of the International Searching Authority in International Application No. PCT/US2008/055079, Sep. 4, 2008.

PCT Notification of Transmittal of the International Search Report and The Written Opinion of the International Searching Authority, or the Declaration with attached International Search Report and the Written Opinion of the International Searching Authority in International Application No. PCT/US2009/060590, Jan. 22, 2010.

PCT Notification of Transmittal of the International Search Report and the Written Opinion of the International Searching Authority, or the Declaration with attached PCT International Search Report and the Written Opinion of the International Searching Authority in International Application No. PCT/US2009/056310, Nov. 17, 2009.

PCT Notification of Transmittal of the International Search Report and the Written Opinion of the International Searching Authority, or the Declaration with attached PCT International Search Report and the Written Opinion of the International Searching Authority in International Application No. PCT/US2010/021474, Apr. 26, 2010.

Schierl, Thomas et al.; "Mobile Video Transmission Using Scalable Video Coding;" *IEEE Transactions on circuits and Systems for Video Technology*; 17:9; pp. 1204-1217, Sep. 2007.

(56) References Cited

OTHER PUBLICATIONS

Singer et al., "ISO Media File format specification," *International Organisation for Standardisation ISO/IEC* 14496-1:2001/Amd. 3, Oct. 31, 2008.
Xin, Jun et al., "Digital Video Transcoding," *Proceedings of the IEEE*, 93:1, pp. 84-97, Jan. 2005.
Office Action for U.S. Appl. No. 12/578,773, Dec. 13, 2010.
Office Action for U.S. Appl. No. 12/208,122, Apr. 19, 2011.
Office Action for U.S. Appl. No. 12/208,122, Oct. 29, 2010.
Office Action for U.S. Appl. No. 11/328,587, Apr. 29, 2011.
Office Action for U.S. Appl. No. 11/328,587, Dec. 10, 2010.
Office Action for U.S. Appl. No. 11/328,587, Jul. 8, 2010.
Office Action for U.S. Appl. No. 11/328,587, Apr. 16, 2009.
Office Action for U.S. Appl. No. 11/328,587, Sep. 19, 2008.
Office Action for U.S. Appl. No. 11/549,226, Apr. 20, 2011.
Office Action for U.S. Appl. No. 11/549,226, Sep. 30, 2010.
Office Action for U.S. Appl. No. 11/549,226, Mar. 1, 2010.
Office Action for U.S. Appl. No. 11/549,226, Aug. 3, 2009.
Office Action for U.S. Appl. No. 11/936,548, Jan. 5, 2010.
Office Action for U.S. Appl. No. 12/690,166, Mar. 24, 2011.
Office Action for U.S. Appl. No. 11/328,587, Oct. 26, 2011.
Office Action for U.S. Appl. No. 12/208,122, Sep. 15, 2011.
Office Action for U.S. Appl. No. 12/208,122, Aug. 25, 2010.
Office Action for U.S. Appl. No. 12/578,773, Nov. 28, 2011.
Office Action for U.S. Appl. No. 12/690,166, Sep. 29, 2011.

\* cited by examiner

SYSTEM AND METHOD FOR MONITORING CONTENT

TECHNICAL FIELD OF THE INVENTION

This invention relates in general to multimedia-content delivery systems, and more particularly, to a method and system for identifying protected content on a content delivery system.

BACKGROUND OF THE INVENTION

The rapid growth in Internet usage has given users access to a wide range of sources for text, audio, video, and multimedia content provided in many different formats. At the same time, the costs of producing content have plummeted, allowing end-users to produce and distribute a substantial amount of media content. As a result, websites that offer free content-hosting services, such as YouTube and MySpace, have become popular both with amateur content providers and with an ever-growing audience.

The exponential growth in the use of content-sharing websites and networks has made it increasingly difficult to monitor user activity. The distribution of copyrighted and otherwise protected content has become a common problem for such websites, as users mix protected content in with the user-generated content intended to be distributed on such websites. Similarly, many such websites and networks prohibit the distribution of pornographic, explicit, or inflammatory content. In fact, the operators of content-sharing sites and networks may face lawsuits from copyright holders and complaints from offended users if protected and/or prohibited content is not identified and removed. Nonetheless, policing the distribution of such files can be difficult, time-consuming, and expensive. Given the exponential growth in the amount of user-uploaded content available on such content-sharing sites, traditional approaches to applying audio/video content detection techniques are no longer effective. Implementation of process-intensive approaches that require in-depth analysis of the content and/or transmission of massive amounts of signature data would result in system configurations that are economically unviable due to cost and complexity.

SUMMARY OF THE INVENTION

In accordance with the present invention, the disadvantages and problems associated with content delivery systems have been substantially reduced or eliminated. In particular, a content-delivery system is disclosed that provides flexible techniques for identifying protected content.

In accordance with one embodiment of the present invention, a method for processing media files includes receiving a request to download a first media file and, in response to receiving the request, generating a first signature that describes a first characteristic of the first media file. The method also includes determining whether the first signature matches any of a first plurality of stored signatures. The method also includes generating a second signature that describes a second characteristic of the first media file in response to determining that the first signature matches one of the first plurality of stored signatures. Additionally the method includes determining whether the second signature matches any of a second plurality of stored signatures and, in response to determining that the second signature matches one or more of the second plurality of stored signatures, denying the request to download the first media file.

Technical advantages of certain embodiments of the present invention include the ability to identify content that is protected, prohibited, and/or otherwise worthy of special processing on a content-delivery system. Additionally, particular embodiments may provide for the optimized use of time and processing resources in identifying the relevant content. Particular embodiments of the content delivery system may also include flexible and customizable techniques for addressing the use of protected or prohibited content that may limit the need for human involvement. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
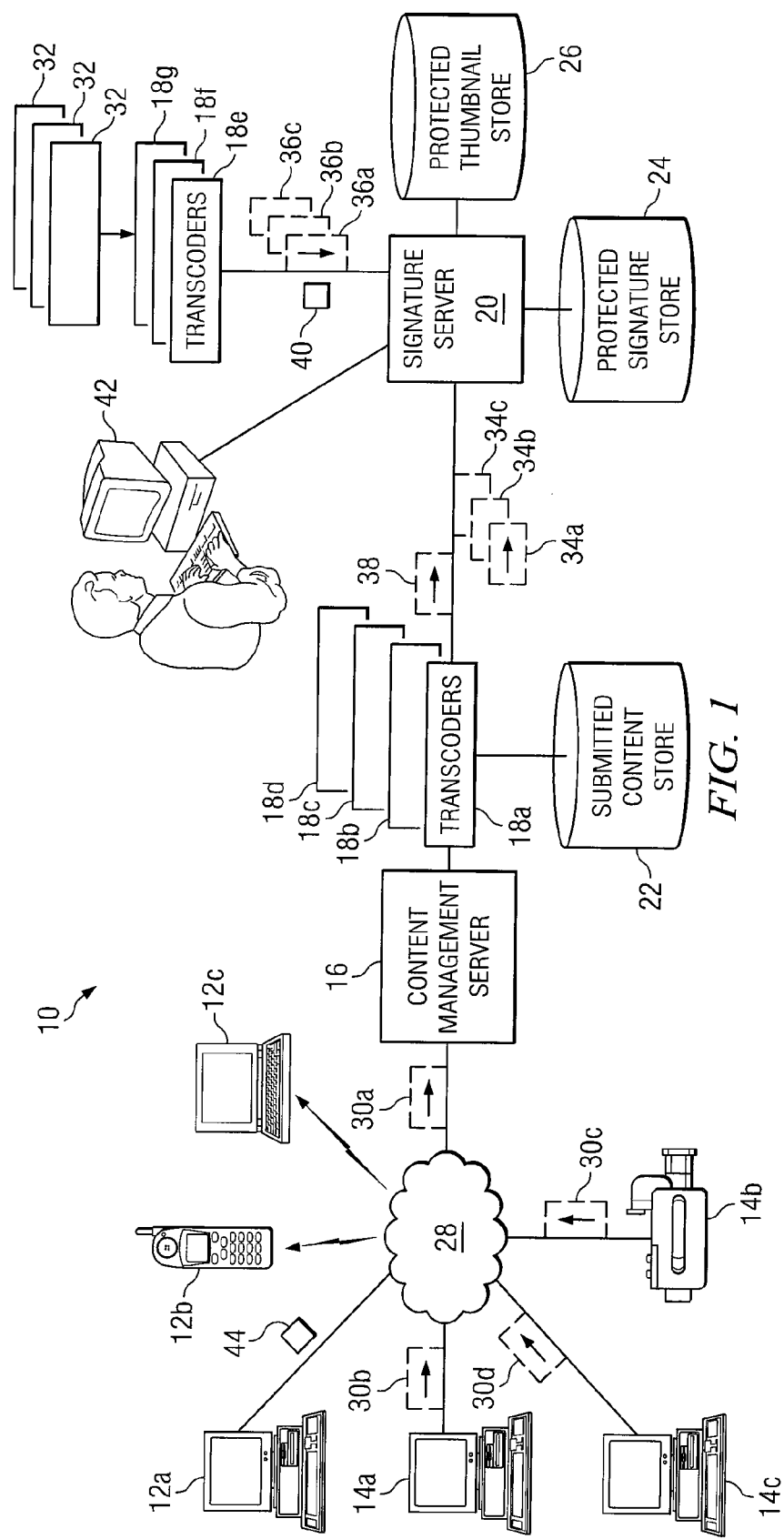
FIG. 1 illustrates a content-delivery system capable of identifying and managing the use of protected content.

FIG. 1 illustrates a particular embodiment of a system 10 for delivering media content to clients 12a-c from submitted content store 22. System 10 includes clients 12a-c, content sources 14a-c, content management server 16, transcoders 18a-d and e-g; signature server 20, submitted content store 22, protected signature store 24, and protected thumbnail store 26, and a network 28. Signature server 20 receives submitted content files 30 from users through content management server 16 and transcoders 18a-d and analyzes submitted content files 30 to determine their contents. By minimizing the time and system resources utilized in analyzing submitted content files 30, particular embodiments of signature server 20 provide efficient techniques for identifying and managing protected content.

In general, within system 10, content sources 14a-c and clients 12a-c connect to content management server 16 through network 28. Content management server 16 connects to submitted content store 22 and manages access to submitted content store 22. Additionally, content management server 16 connects to transcoders 18a-d and forwards submitted content files 30 to transcoders 18a-d for transcoding. Transcoders 18a-d are coupled to signature server 20 and transmit content signatures for submitted content files 30 to signature server 20 for analysis. Similarly, transcoders 18e-g are also coupled to signature server 20 and transmit content signatures for protected content files 32 to signature server 20. Based on a comparison of these content signatures, signature server 20 determines whether submitted content files 30 include protected content and, if so, initiates an appropriate remedial action, such as refusing to upload submitted content files 30 or notifying a human operator 42.

More specifically, clients 12a-c display content retrieved from submitted content store 22 to users, such as subscribers to a web site or content-sharing service. Clients 12a-c may each represent any type of device appropriate to display one or more type of content utilized in system 10. Examples of clients 12a-c may include, but are not limited to, computers, video-enabled telephones, media players (such as audio- and/or video-capable iPods), televisions, and portable communication devices. In general, however, clients 12a-c may include any appropriate combination of hardware, software, and/or encoded logic suitable to provide the described functionality. Clients 12a-c may couple to network 28 through a dedicated connection, wired or wireless, or may connect to network 28 as needed to access media content. For example, clients 12, such as portable media players, may connect temporarily to network 28 to download submitted content files 30 but then disconnect before displaying content from the submitted content files 30. Although FIG. 1 illustrates, for purposes of example, a particular number and type of clients 12, alternative embodiments of system 10 may include any appropriate number and suitable type of clients 12.

Content sources 14 provide media content, such as submitted content files 30, to system 10. Content from content sources 14 is uploaded through network 28 to submitted content store 22 and made available for display by clients 12. For example, media content such as video and audio files may be entered into a content source 14a, such as a computer, and sent over network 28 to be stored in submitted content store 22 for subsequent access by users through clients 12. Content sources 14 may include any form of media generation and/or capture devices, such as personal computers, video cameras, camera-enabled telephones, audio recorders, and/or any other device capable of generating, capturing, or storing media content.

Although FIG. 1 shows only content sources 14a-c, it will be understood that system 10 can accommodate very large numbers of content sources 14 and large numbers of submitted content files 30. Although the description below focuses on embodiments of system 10 in which content originates from content sources 14, system 10 may utilize content that originates at and/or is provided to content store 12, or system 10 generally, in any appropriate manner. For example, content store 12 may include, or be configured to accept, detachable storage media, such as compact discs (CDs) or digital video discs (DVDs). In such embodiments, content may be introduced into system 10 as a result of detachable storage media containing submitted content files 30 being coupled to or accessed by content store 12. More generally, however, content may be provided to system 10 in any appropriate manner.

Network 28 represents any form of communication network supporting circuit-switched, packet-based, and/or any other suitable type of communication. Although shown in FIG. 1 as a single element, communication network may represent one or more separate networks, including all or parts of various different networks that are separated and serve different groups of clients 12. Network 28 may include routers, hubs, switches, gateways, call controllers, and/or any other suitable components in any suitable form or arrangement. In general, network 28 may comprise any combination of public or private communication equipment such as elements of the public-switched telephone network (PSTN), a global computer network such as the internet, a local area network (LAN), a wide-area network (WAN), or other appropriate communication equipment.

Content management server 16 processes requests from content sources 14 to upload submitted content files 30 to submitted content store 22 and from clients 12 to download submitted content files 30 from submitted content store 22. Content management server 16 may additionally authenticate users, execute content search requests, and/or otherwise facilitate interaction between users and the content-provision services offered by system 10. In particular embodiments, content management server 16 may be responsible for initiating transcoding and/or signature analysis of submitted content files 30 when uploaded by content sources 14.

Transcoders 18 convert or modify submitted content files 30 to a type and/or format appropriate for transmission to, storage on, and/or display by a particular client 12. Transcoders 18 may modify the media content by translating, transcoding, transrating, encoding, rendering, and/or processing or otherwise modifying the relevant content to the requirements of a particular client 12. As specific examples, transcoders 18 may modify submitted content files 30 by changing the codec, bit-rate, associated communication protocol, type of storage medium, compression, and/or digital rights management information of the relevant content. Particular embodiments of system 10 may only support fixed input and/or output formats and, as a result, may not include any transcoders 18. Additionally, in particular embodiments, transcoding may be done independently from the signature matching performed by signature server 24. As a result, transcoding may be performed outside the signature-analysis datapath.

Additionally, FIG. 1 illustrates a particular embodiment of system 10 in which transcoders 18a-d are responsible for generating at least a portion of the content signatures used by signature server 20 to compare submitted content files 30 to protected content files 32. In the illustrated example, after decoding submitted content files 30 and before re-encoding submitted content files 30, transcoders 18a-d generate one or more lightweight content signatures (shown in FIG. 1 as first-level submitted signatures 34a-c) that can be quickly generated using a minimal amount of processing resources. Transcoders 18a-d may then transmit these lightweight signatures to signature server 20 to be used as in the first level of multi-level signature analysis.

Furthermore, in particular embodiments, one or more transcoders 18 may be responsible for generating content signatures for protected content files 32 received by system 10. Such transcoders 18 may be dedicated solely to signature generation for protected content files 32 or may be configured to process both submitted content files 30 and protected content files 32 as needed. In the illustrated embodiment, system 10 includes transcoders 18e-g that are dedicated to generating content signatures for protected content files 32. More specifically, in the illustrated embodiment, transcoders 18e-g generate lightweight content signatures for protected content files 32 that utilize the same algorithms as those used by transcoders 18a-d. These lightweight content signatures are shown in FIG. 1 as first-level protected signatures 36a-c.

Signature server 20 compares content signatures generated from submitted content files 30, such as first-level submitted signatures 34, to content signatures generated from protected content files 32, such as first-level protected signatures 36, to determine whether submitted content files 30 represent or include protected content. If signature server 20 determines that a sufficiently high level of similarity exists between a particular submitted content file 30 and one or more protected content files 32, signature server 20 may initiate an appropriate remedial action, such as refusing an upload or download request, removing a copy or copies of submitted content file 30, or notifying a supervisor 42, to prevent the submitted content file 30 from being used and/or misused on system 10. In particular embodiments, signature server 20 may also be responsible for maintaining information describing protected content files 32 in protected signature store 24 and protected thumbnail store 26. Additionally, as described further below, signature server 20 may utilize multi-level signature analysis techniques to provide more efficient use of the processing resources available to system 10.

In general, content management server 16, transcoders 18, and signature server 20 may each represent any appropriate combination of hardware, software, and/or encoded logic suitable to provide the described functionalities. In particular embodiments, each of content management server 16, transcoders 18, and signature server 20 represents a physically separate server programmed to operate as described herein. Alternatively, in particular embodiments, any of content management server 16, transcoders 18, and signature server 20 may share or represent the same physical components. For example, in particular embodiments, system 10 may include a server that houses a plurality of digital signal processor (DSP) groups that are collectively capable of providing the functionality described for both transcoders 18 and signature server 20. As a result, transcoders 18 and signature server 20 may be housed in a single physical component. More generally, however, the functionality provided by content management server 16, transcoders 18, and signature server 20 may in particular embodiments be divided among the various physical components of system 10 in any appropriate manner.

Submitted content store 22 stores submitted content files 30 transmitted to submitted content store 22 by transcoders 18, while protected signature store 24 and protected thumbnail store 26 store information relating to protected content files 32, as described further below. Submitted content store 22, protected signature store 24, and protected thumbnail store 26 may represent or include any appropriate type of memory devices. Moreover, stores 22, 24, and 26 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. In particular embodiments, submitted content store 22 represents a storage area network (SAN) to which submitted content files 30 are uploaded. Such a SAN may receive and store, for example, video and sound files from a plurality of different sources, the files having a variety of different formats and characteristics. Additionally, content thumbnails are only one example of the types of content signatures that may be utilized in particular embodiments of system 10. As a result, in particular embodiments, protected thumbnail store 26 may be replaced by storage for alternative types of signatures or omitted altogether.

Submitted content files 30 represent media content submitted by users for storage on content provision system 10, while protected content files 32 represent media content used by content provision system 10 to identify protected content and/or other content of interest. In general, submitted content files 30 and protected content files 32 may represent media content structured in any appropriate manner. Examples of content files 30 and 32 include Moving Picture Experts Group (MPEG), Windows Media Video (WMV), Audio Video Interleave (AVI), and Quicktime video files; audio content such as Waveform audio (WAV), MPEG-1 Audio Layer 3 (MP3), and/or Windows Media Audio (WMA) files; image data such as Joint Photographic Experts Group (JPEG) or Tagged Image File Format (TIFF) files; and/or content of any other appropriate type or format. For example, a particular embodiment of content provision system 10 may be specifically configured to support such formats as Microsoft DV, Video for Windows, DirectShow, QuickTime, MPEG-2, MPEG-4, Windows Media, DivX, MP3, PCM WAV, AVISynth script, Audio Compression Manager (ACM), Macromedia Flash, RealVideo, VOB (DVD-Video image), Windows bitmap (BMP), TGA, TIFF, Portable Network Graphics (PNG), and JPEG and, when requested, process, modify, or convert the stored media for output as one or more of an MPEG-2, MPEG-4, or SDI-encoded video stream to clients 12.

In operation, content management server 16, transcoders 18, and signature server 20 interact to satisfy requests to upload submitted content files 30 from content sources 14 and to download submitted content files 30 for clients 12. In the illustrated embodiment, content is uploaded from content sources 14 to system 10 in the form of submitted content files 30. More specifically, in the illustrated example, a client 12 transmits a submitted content file 30 to content management server 16 for storage on submitted content store 22. Subsequently clients 12 may request download of submitted content files 30 from submitted content store 22 for playback or display to users.

To illustrate this process, FIG. 1 shows an example in which a user attempts to upload a submitted content file 30, here submitted content file 30a, to submitted content store 22. As shown in FIG. 1, the user attempts to upload submitted content file 30a by transmitting submitted content file 30a to content management server 16. For example, a user may attempt to upload submitted content file 30a to a content-sharing website as part of a Hypertext Transfer Protocol (HTTP) POST operation. In response, content management server 16 stores the submitted content file 30a in an appropriate location within submitted content store 22.

Users may then be able to download submitted content file 30a from content source 14 for viewing on clients 12. Users may download submitted content file 30a in any appropriate manner based on the configuration and capabilities of content management server 16, transcoders 18, and/or other appropriate components of system 10. In particular embodiments, users may download a particular submitted content file 30 by transmitting a download request 44 of an appropriate form to content management server 16 and/or transcoder 18. Download request 44 may represent any appropriate message, query, and/or other communication by which clients 12 may request the download of a particular submitted content file 30 stored in submitted content store 22. For example, in particular embodiments, a client 12 may transmit a download request 44, such as an HTTP request identifying a particular submitted content file 30 stored on submitted content store 22, to content management server 16.

In response to receiving download request 44, content management server 16 may retrieve the requested submitted content file 30 (here, submitted content file 30a) from submitted content store 22. Content management server 16 may then initiate a signature analysis process to determine whether the submitted content file 30a represents and/or includes protected content. As part of this process, content management server 16 transmits submitted content file 30a to a selected one of transcoders 18a-d. In particular embodiments, the selected transcoder 18 decodes submitted content file 30a from its original media format to raw content (e.g., raw video). In the illustrated embodiment, the selected transcoder 18 then generates one or more content signatures based on the raw content from submitted content file 30a. Although FIG. 1 illustrates an embodiment of system 10 in which transcoders 18a-f generate first-level and second-level content signatures, in alternative embodiments, signature server 20, other components of system 10, or components external to system 10 may instead be responsible for generating one or more of the content signatures utilized by system 10. For example, the copyright holder for protected content files 32 may generate content signatures for protected content files 32 and transmit these to system 10 for use in signature analysis.

The generated content signatures each describe one or more characteristics of submitted content file 30a. Each content signature may represent a file, a collection of one or more values, a binary indication of whether a particular condition is satisfied by the corresponding submitted content file 30, and/or any appropriately structured information that describes characteristics of the corresponding content files. Examples of these content signatures may include, but are not limited to, image histograms, grayscale values, chroma values, frequency domain representations of the image (e.g., a wavelet representation), the results of object identification algorithms (e.g., an indication of whether a face was detected at a particular location within the content file or foliage was detected in the background of the content file), the results of other pattern recognition algorithms, and/or any other appropriate description of the contents of the corresponding content files. Additionally, in particular embodiments, these content signatures may represent a portion of the relevant content file itself. Moreover, for multimedia content, each content signature may represent characteristics of the video portion of the content, the audio portion, or both. An example technique for generating a particular type of first-level signature are discussed in greater detail below with respect to FIG. 4.

Additionally, as noted above, the content signatures generated by transcoders 18 may represent part of the first-level in a multi-level signature analysis process. Moreover, these content signatures may be generated using a set of lightweight signature-generating algorithms that can be quickly generated and/or generated using a limited amount of processing capacity. Thus, in the illustrated example, the selected transcoder 18 generates a plurality of first-level submitted signatures 34a-c based on submitted content file 30a and transmits these first-level signatures 34 to signature server 20 for analysis.

Meanwhile, at any appropriate time while system 10 is operational, system 10 may receive protected content files 32 containing protected content. As used in this description and the claims that follow, "protected content" may include any form of copyrighted, restricted-use, or licensed content, or any content users of system and/or the general public are not authorized to use. In particular embodiments, "protected content" may also include pornographic, explicit, and/or offensive content, or content that users may be prohibited from using or disseminating on system 10 for any other reason.

In the illustrated embodiment, as system 10 receives protected content files 32, protected content files 32 are transmitted to one or more transcoders 18 responsible for processing protected content (transcoders 18e-g in FIG. 1). Similar to transcoders 18a-d, transcoders 18e-g decode protected content files 32 and generate first-level protected signatures 36 from the resulting raw video. Transcoders 18e-g utilize the same first-level signature generation algorithms as transcoders 18a-d use to generate first-level submitted signatures 34. Additionally, in particular embodiments, transcoders 18e-g may generate one or more second level content signatures for protected content files 32, such as protected thumbnails 40, for each protected content file 32. Each protected thumbnail 40 represents a portion of the corresponding protected content files 32, such as one or more frames. In particular embodiments, each protected thumbnail 40 represents a time average of multiple (e.g., five) consecutive frames of the corresponding protected content files 32. Transcoders 18e-g may transmit these first-level protected signatures 36 and protected thumbnails 40 to signature server 20. Signature server 20 may then store first-level protected signatures 36 in protected signature store 24 and protected thumbnails 40 in protected thumbnail store 26.

As a result, when signature server 20 receives first-level submitted signatures 34 from one of transcoders 18a-d, signature server 20 may compare each first-level submitted signature 34 for submitted content file 30a to a corresponding set of first-level protected signatures 36 maintained by signature server 20. For example, if submitted content signature 34a represents gray scale values extracted from submitted content file 30a, signature server 20 compares submitted content signature 34a to a set of protected content signatures 36, each representing gray scale values generated from a different protected content file 32 recognized by system 10. Similarly, if submitted content signature 34b represents chroma values extracted from submitted content file 30a, signature server 20 compares submitted content signature 34b to another set of protected content signatures 36, each representing chroma values generated from a different protected content file 32 recognized by system 10. Signature server 20 may perform these comparisons in any appropriate manner based on the configuration and capabilities of signature server 20. One example of how such comparisons may be implemented in particular embodiments of signature server 20 is discussed in greater detail below with respect to FIG. 4.

Signature server 20 then determines, based on the comparison between first-level submitted signatures 34 and their corresponding first-level protected signatures 36, whether submitted content file 30 is sufficiently similar to one or more protected content files 32 to warrant remedial action and/or further investigation. For example, as noted above, signature server 20 may utilize a multi-level technique for signature analysis and may perform multiple different levels of signature comparisons. As a result, in response to determining that first-level submitted signatures 34 are sufficiently similar to one or more corresponding set of first-level protected signatures 36, signature server 20 may generate additional content signatures from submitted content file 30a. For example, in the illustrated example, signature server 20 generates or retrieves an additional signature, such as submitted thumbnail 38, that is created using a signature generation algorithm different from those used to generate first-level submitted signatures 34.

In particular embodiments, the additional signature or signatures generated by signature server 20 may represent part of a second-level of signature analysis that utilizes a more detailed comparison of submitted content files 30 and protected content files 32. In particular embodiments, second-level signature analysis may consider aspects of submitted content files 30 that will not vary as a result of any rotation, translation or scaling of submitted content files 30. For example, this second-level signature analysis may utilize signature generation algorithms that consider on frequency domain characteristics of the relevant content files including Gabor filters, Fourier-Mellin transforms, and wavelet analysis of the relevant content.

Additionally, in particular embodiments, this second-level requires a greater expenditure of time and/or processing capacity than the first-level signature analysis that generates and compares first-level signatures 34 and 36. As a result, in such embodiments, the first level of signature analysis may allow signature server 20 to easily determine that certain submitted content files 30 do not comprise protected content and thereby dramatically reduce the number of submitted content files 30 for which signature server 20 performs second-level signature analysis. This may, in turn, significantly reduce the time and/or processing resources that are used in identifying protected content.

After generating or retrieving the appropriate second-level signatures (e.g. submitted thumbnails 38), signature server 20 compares the relevant second-level signature to a second set of protected content signatures (e.g., protected thumbnails 40). This second set of protected content signatures is generated using the same second-level signature algorithm or algorithms used to generate the second-level submitted signatures. As noted above, in particular embodiments, this second-level comparison may involve a more detailed comparison of one or more characteristics of submitted content file 30 to those of protected content files 32. If this more detailed comparison indicates that submitted content file 30 matches one or more protected content files 32, signature server 20 determines that submitted content file 30 may represent and/or include protected content.

In response to determining that submitted content file 30 may represent and/or include protected content, signature server 20 may initiate one or more remedial actions with respect to submitted content file 30. These remedial actions may include any appropriate steps to prevent submitted content file 30 from being uploaded to submitted content store 22 and/or downloaded by clients 12, to remove protected content from submitted content file 30, and/or to otherwise to manage storage and use of submitted content file 30. As one example, in particular embodiments, signature server 20 may refuse (or instruct appropriate components of system 10 to refuse) the request to download submitted content file 30 from submitted content store 22.

Moreover, signature server 20 may (or may instruct appropriate components of system 10 to) remove submitted content file 30 from submitted content store 22, flag submitted content file 30 as protected, or take other appropriate steps to ensure submitted content file 30 is not downloaded by subsequent users. As a result, signature server 10 may avoid having to repeat the analysis of submitted content file 30 for future requests associated for that same submitted content file 30. As one specific example, in particular embodiments, users may be able to initiate keyword searches to identify desired content stored in submitted content store 22. In such embodiments, signature server 20 may take appropriate steps to prevent submitted content file 30 from being displayed as part of search results for a subsequent searches regardless of whether submitted content file 30 matches the keywords associated with those subsequent searches. As a result, in particular embodiments, users may be prevented from requesting submitted content files 30 containing protected content even without the protected content being removed from submitted content store 22.

As another example, in particular embodiments, signature server 20 may notify (or instruct appropriate components of system 10 to notify) the user attempting to download submitted content file 30 that the request is being denied. Signature server 20 may notify the relevant user in any appropriate manner based on the configuration of system 10. For example, in particular embodiments, signature server 20 may transmit an HTTP response to the user indicating that the request to download submitted content file 30 to system 10 has been declined. Alternatively, signature server 20 may transmit an email message to user requesting that the user contact an operator of system 10 to discuss whether submitted content file 30 should be uploaded to or downloaded from system 10. In particular embodiments, this email may include all or a portion of the submitted content file 30 and all or a portion of a matching protected content file 32.

As yet another example, in particular embodiments, signature server 20 may submit submitted content file 30 for human review. For example, in particular embodiments, signature server 20 may transmit submitted content file 30 to a human operator 42 of system 10 for review. In particular embodiments, signature server 20 may additionally transmit a protected content file 32 matching submitted content file 30 to human operator 42. The relevant information may be communicated to human operator 42 in any appropriate manner based on the configuration and capabilities of system 10. For example, in particular embodiments, signature server 20 may generate an email message that includes submitted content file 30 and all or a portion of protected content files 32 and transmit this email message to human operator 42 for review.

After receiving submitted content file 30, human operator 42 may review submitted content file 30 and, if appropriate, the corresponding protected content files 32 to determine whether submitted content file 30, in fact, represents or includes protected content. Human operator 42 may then initiate additional remedial actions to prevent use or misuse of the relevant protected content. For example, human operator 42 may deny the request to download submitted content file 30 and notify the user attempting to download submitted content file 30 that the request has been denied.

Returning to the example, if signature server 20 instead determines during either first-level or second-level signature analysis, that submitted content file 30 does not include or represent any protected content, signature server 20 may instruct transcoder 18 or other components of system 10 to allow the requesting client 12 to download the relevant submitted content file 30. As a result, transcoder 18 may complete transcoding of submitted content file 30*a*. As part of this process, transcoder 18 may encode the raw video from which the relevant transcoder 18 originally generated the content signatures in a format appropriate for playback or display on the requesting client 12. In particular embodiments, this may, under certain circumstances, result in requested content files 30 being encoded in a different format than they were originally stored in submitted content store 22. For example, submitted media file 30*a* may be encoded based on a first codec when originally uploaded to system 10 but, after signature analysis has been completed, transcoder 18 may encode submitted media file 30*a* based on a second codec appropriate for display on the requesting client 12. Transcoder 18 may then transmit the encoded submitted content file 30*a* to the requesting client 12, directly or indirectly through another component of system 10 (such as content management server 12). The requesting client 12 may then begin playback or display of submitted content file 30*a*.

Thus, in particular embodiments, system 10 supports techniques for efficiently identifying protected content submitted by users. By providing a multi-level identification process, particular embodiments of system 10 may limit the possibility that submitted content will be incorrectly flagged as protected content without requiring system 10 to utilize excessive amounts of time and/or processing resources. In particular, by applying time- or resource-intensive signature algorithms to a particular submitted content file 30 only after determining a minimum likelihood that the submitted content file 30 comprises protected content, system 10 may limit the frequency with which these time- or resource-intensive algorithms are utilized during signatures analysis. Furthermore, by limiting the number of protected content files 32 to which the submitted content file 30 is compared during second-level signature analysis, particular embodiments of system 10 may further reduce time and resources expended in analyzing submitted content files 30 to identify protected content. Additionally, in embodiments in which signature analysis is carried out by multiple different components working together, this multi-level signature analysis may reduce the frequency with which the more detailed and larger signatures are transmitted between the relevant components and/or stored in temporary memory. As a result, in particular embodiments, network bandwidth and memory usage may also benefit from the described techniques.

Overall, the more efficient use of network processing, transmission, and/or storage resources may allow signature analysis to be performed as part of a realtime or near-realtime transcode process with minimal affect on the upload or download time of the user. Consequently, submitted content files 30 may be analyzed during the transcoding process and available for viewing immediately after uploading without any delay for review. As a result, particular embodiments of system 10 may provide numerous operational benefits. Specific embodiments, however, may provide some, none, or all of these benefits.

Although FIG. 1 illustrates a particular embodiment of content provision system 10 in which signature server 24 compares content signatures from submitted content files 30 to signatures generated from specific protected content files 32, content provision system 10 may, in particular embodiments, manage the submission and/or replay of submitted content files 30 to prevent general categories of prohibited content from being submitted or replayed. For example in particular embodiments, signature server may prevent pornographic content from being stored on content provision system 10. In such embodiments, instead of comparing content signatures of submitted content file 30a to signatures associated with specific protected content files 32, signature server 20 may compare content signatures of submitted content file 30a to generic signature templates defining typical characteristics of pornographic content, such as the presence of certain skin-toned patterns in submitted content.

Furthermore, in particular embodiments, signature server 20 may additionally or alternatively be responsible for ensuring that duplicate copies of submitted content files 30 are not stored on content provision system 10. As a result, after generating or receiving content signatures of a particular submitted content file 30, signature server 20 may store these content signatures for comparison to submitted content files 30 received at a later time. In such embodiments, signature server 20 may then initiate a remedial action or further investigation if a content signature previously generated matches content signatures from any previously uploaded submitted content file 30. For example, signature server 20 may decline a request to upload a particular submitted content file 30 if signature server 20 determines, based on previously generated first-level submitted signatures 34, that the relevant submitted content file 30 has already been uploaded to system 10.

In addition, although the description above focuses, for the sake of simplicity, on embodiments in which signature server 20 performs only two levels of signature analysis, alternative embodiments of system 10 may be configured to perform any appropriate number of levels of signature analysis. As a result, in particular embodiments, signature server 20 may, in response to identifying a match between a second-level signature for submitted content file 30 and second-level signatures for one or more protected content files 32, initiate a third and/or additional levels of signatures analysis. As part of these additional levels, signature server 20 may generate and utilize additional content signatures as appropriate.

Furthermore, although the description above also focuses on an embodiment in which signature analysis is performed when submitted content files 30 are uploaded, signature analysis may be performed at any appropriate time during operation. In particular, signature analysis may alternatively be done when submitted content files 30 are downloaded for use. For example, in particular embodiments, transcoders 18a-f and signature server 20 may represent or include components operated by a content provider or owner of protected content files 32. In such embodiments, system 10 may include a web robot, or "bot," or other appropriate components capable of retrieving submitted content files 30 stored on a submitted content store 22 of the content-sharing network. This web robot may then be able to initiate signature analysis of the retrieved content files 30 to determine whether any of the content available on the content-sharing network represents protected content owned by the content provider.

Figure 2:
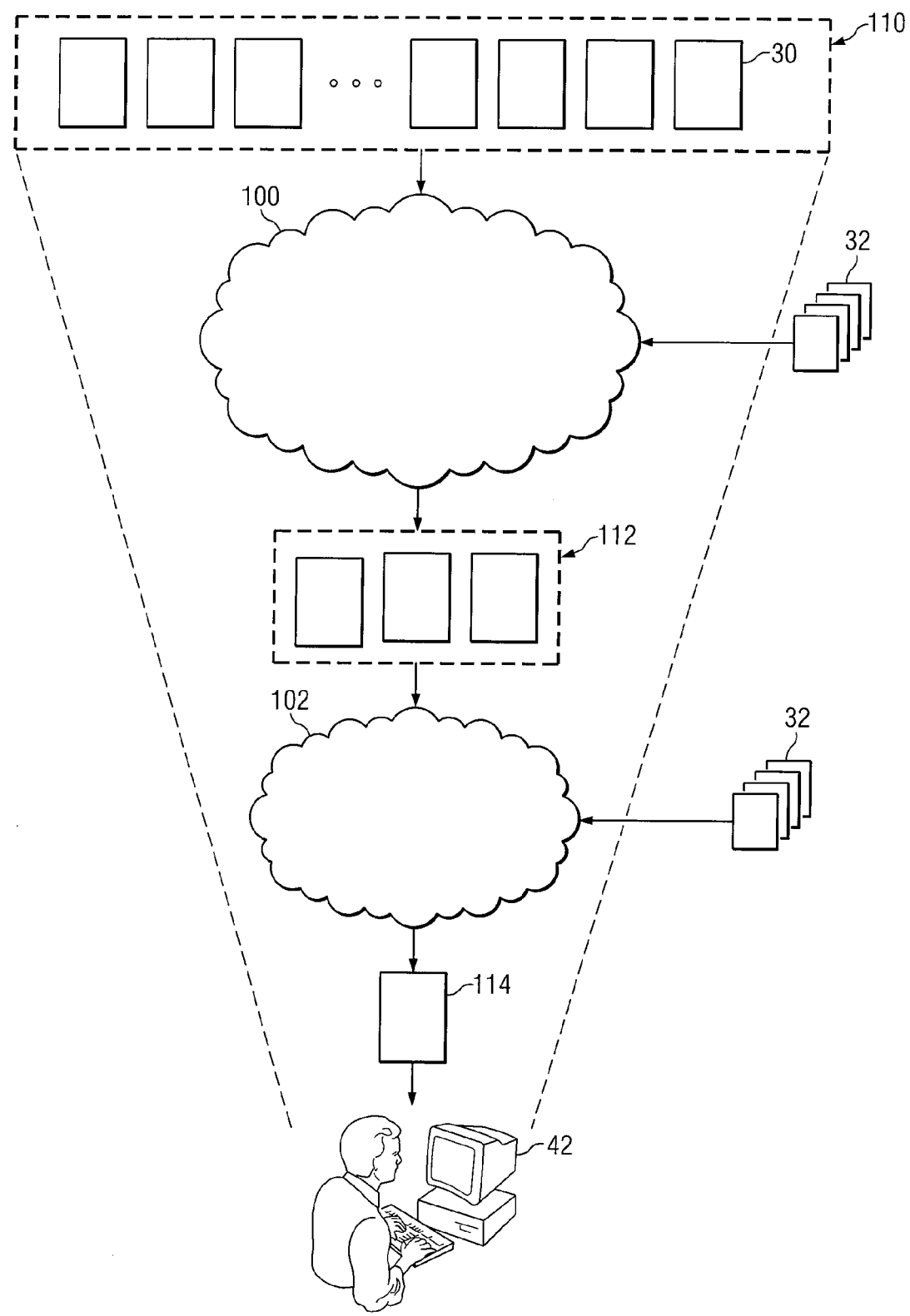
FIG. 2 is a conceptual illustration of a multi-level signature analysis process that may be utilized by particular embodiments of the content-delivery system.

FIG. 2 is a conceptual illustration of how particular embodiments of system 10 may implement the multi-level signature analysis techniques discussed in FIG. 1. As noted above, the various levels of signature analysis may, in specific embodiments, be performed by any appropriate components within system 10. As a result, in FIG. 2, a first component or set of components (represented by cloud 100) performs a first-level of signature analysis, a second component or set of components (represented by cloud 102) performs a second-level of signature analysis, and a human operator 42 performs a final confirmation. In alternative embodiments, as noted above, system 10 may include any appropriate number of signature-analysis levels.

In particular embodiments, first group 110 of submitted content files 30 includes all submitted content files 30 uploaded by users of system 10. The component or components responsible for performing the first-level of signature analysis generate first-level signatures for first group 110 and first-level signatures for the protected content files 32 recognized by system 10. The first-level analysis component(s) then compare first-level signatures for all submitted content files 30 with first-level signatures for all protected content files 32. In particular embodiments, the algorithms used in this first-level comparison are selected to minimize false negatives and to limit the amount of time and system resources required to complete first-level analysis. Based on the first-level comparison, the first-level analysis component(s) identify second group 112, a subset of the files in first group 110, to be submitted for second-level signature analysis. Second group 112 represents those submitted content files 30 that exhibit a sufficient level of similarity with one or more protected content files 32 to warrant more detailed review.

The component or components (represented by cloud 102) responsible for performing the second-level of signature analysis then receive second group 112. The second-level analysis component(s) may then generate second-level signatures for second group 112 and any protected content files 32 identified as matching the second group 112 during first-level signature analysis. Based on this comparison, the second-level analysis component(s) identify third group 114, a subset of the files in second group 112, to be submitted for human review. Third group 114 represents those submitted content files that exhibit a sufficient level of similarity with one or more protected content files 32, based on a comparison of second-level signatures, to warrant human review.

Although shown in FIG. 2 as a two-level analysis, the analysis performed by system 10 may include a third and/or additional layers. In general, the analysis performed by system 10 may involve any appropriate number of levels. Furthermore, in particular embodiments, the signature analysis performed may become more complex with each successive level. In particular embodiments, this complexity may relate to the amount of time, processing capacity, and/or network communication bandwidth expended in completing the various different levels of analysis.

As discussed further below, the submitted content files 30 in third group 114 may then be reviewed by human operator 42. As part of this human review, each of the submitted content files 30 in third group 114, or portions of those files, may be forwarded to human operator 42 for review. The matching protected content file or files 32, or portions thereof, may also be forwarded to human operator 42. Human operator 42 may then compare each file from third group 114 to the protected content files 32 identified by second-level signature analysis to determine whether the submitted content files 30 in the third group 114 represent or include protected content. If appropriate, human operator 42 may then initiate a remedial action to prevent the relevant submitted content files 30 from being uploaded or otherwise manage the transmission and/or storage of those submitted content files 30.

Consequently, as can be seen by FIG. 2, the number of submitted content files 30 reviewed decreases with each stage of the process. By using lightweight signatures to eliminate non-matching submitted content files 30 in the first level, system 10 may greatly reduce the number of submitted content files 30 that advance to the time- or resource-intense stages of the multi-level process and/or to human review. This may, in turn, increase the overall performance and throughput of system 10 and result in a content-screening process that is economically feasible in terms of the processing and network bandwidth consumed. For example, in particular embodiments, appropriately-selected first-level signature analysis algorithms may limit the number of submitted content files 30 reaching second-level analysis to only ten percent (10%) of the files in first group 110 with only a minimal amount of protected content avoiding detection.

Additionally, as discussed further below, by adjusting the configuration of system 10, an operator of system 10 can control the number of submitted content files 30 that advance through each stage of analysis. This may allow the operator to achieve an acceptable tradeoff between the expenditure of resources and the detection of protected content. As a result, in particular embodiments, the operator may be able to control the impact of signature analysis on overall system performance. For example, if it is determined that an unacceptable amount of protected content is avoiding detection, the operator may reduce the minimum level of similarity required for a submitted content file 30 to advance to second-level signature analysis. By contrast, if system performance is being substantially degraded as a result of second-level (or higher) signature analysis, the operator may increase the minimum level of similarity required for submitted content files 30 to advance to the second level.

Figure 3:
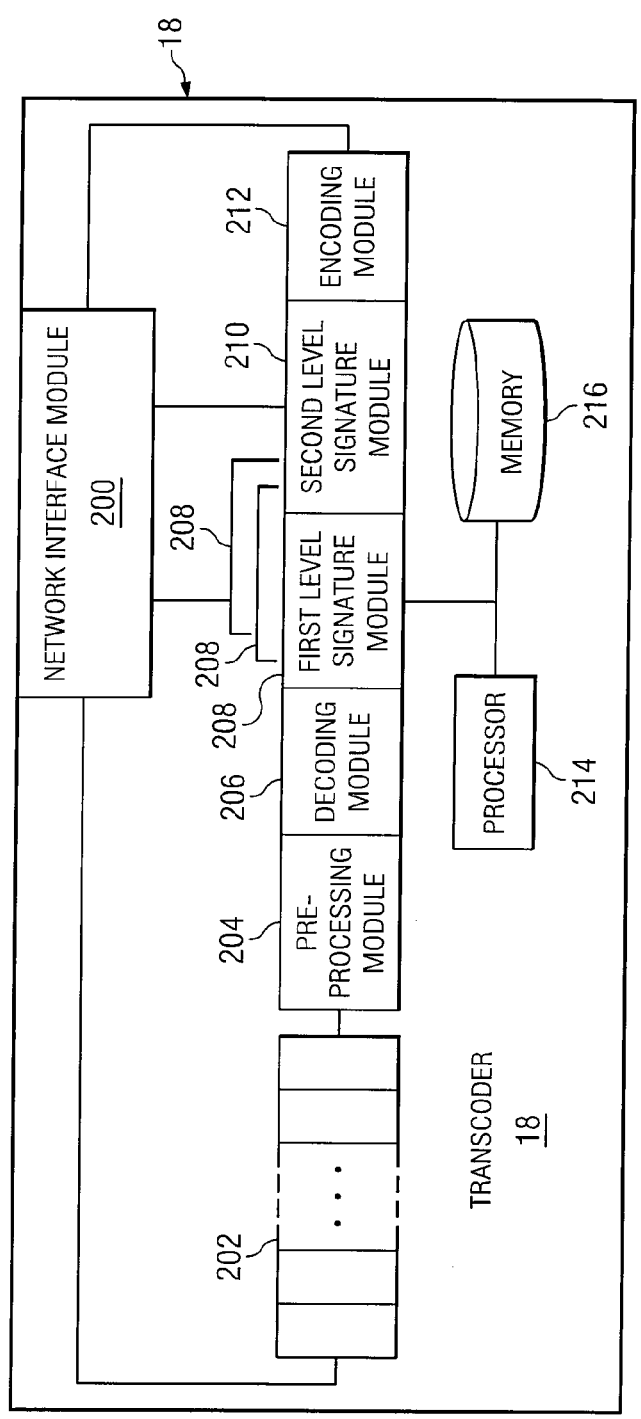
FIG. 3 illustrates in further detail a transcoder that may be included in particular embodiments of the content-delivery system.

FIG. 3 is a block diagram illustrating in greater detail the functional contents and operation of a particular embodiment of transcoder 18. As illustrated, transcoder 18 includes a network interface module 200, a queue 202, a pre-processing module 204, a decoding module 206, a plurality of first-level signature modules 208, a second-level signature module 210, an encoding module 212, a processor 214, and a memory 216. As noted above, with respect to FIG. 1, signature-generation functionality may be divided between transcoder 18 and signature server 20 in any appropriate manner and, as a result, first-level signature modules 208 and/or second-level signature module 210 may not be included in certain embodiments of transcoder 18.

Network interface module 200 facilitates communication between transcoder 18 and content management server 16, signature server 20, and/or other components of system 10. In particular embodiments, network interface module 200 includes or represents one or more network interface cards (NICs). To support multiple simultaneous content flows, network interface module 200 may include multiple ports through which network interface module 200 can receive/transmit multiple flows simultaneously.

Queue 202 stores received content until pre-processing module 206 is available to process the content. In particular embodiments, queue 202 represents a portion of memory 216 used to buffer content until pre-processing can begin. Although FIG. 3 shows only a single queue 202 located at the front of the illustrated datapath, transcoders 18 may include additional queues 202 to buffer data transferred between any of modules 204-212 or to buffer data while being processed by a particular module 204-212.

Each of pre-processing module 204, decoding module 206, first-level signature modules 208, second-level signature module 210, and encoding module 212 provides certain processing functionality, as described further below. Pre-processing module 204, decoding module 206, first-level signature modules 208, second-level signature module 210, and encoding module 212 may each represent any appropriate combination of hardware, software, and/or encoded logic suitable to provide the described functionality. Additionally, modules 204-212 may together and individually represent a single physical component or any appropriate number of separate physical components depending on the configuration of transcoder 18. In particular embodiments, modules 204-212 represent software applications executing on processor 214.

Processor 214 may represent or include any form of processing component, including dedicated microprocessors, general purpose computers, or other processing devices capable of processing electronic information. Examples of processor 214 include microprocessors, digital signal processors (DSPs), application-specific integrated circuits (ASICs), field-programmable gate arrays (FPGAs), and any other suitable specific or general purpose processors. Although FIG. 3 illustrates, for the sake of simplicity, an example embodiment of transcoder 18 that includes a single processor 214, transcoder 18 may include any number of processors 214 configured to interoperate in any appropriate manner.

Memory 216 stores processor instructions, codecs, routing tables, and/or any other parameters or data utilized by elements of transcoder 18 during operation. Memory 216 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. Although shown as a single functional element in FIG. 3, memory 216 may include one or more memory devices local to and specifically associated with components or modules of transcoder 18. Furthermore, in particular embodiments, all or a portion of memory 216 may represent a hard drive contained within transcoder 18.

In operation, pre-processing module 204 receives a content file (such as submitted content files 30 or protected content files 32) transmitted to transcoder 18 for transcoding and/or signature generation. Pre-processing module 204 may perform any appropriate decrypting, filtering, logging, and/or other forms of processing to the received content file prior to decoding. After any appropriate pre-processing, pre-processing module 204 transmits the received content file to decoding module 206.

In particular embodiments, pre-processing module 204 may be configured to recognize specific protected content within a submitted content file 30 and process the received content file as appropriate. For example, if it is determined that a large number of users are uploading copies of a particular protected content file 32, pre-processing module 204 may be configured to recognize characteristics of that specific content file. As a result, pre-processing module 204 may be configured to identify characteristics such as file size, media type (e.g., video, audio), time duration, and/or other characteristics of the protected content file to quickly determine that a submitted content file 30 is a copy of the relevant protected content file 32.

For example, a large number of users may attempt to upload a particular Super Bowl commercial immediately after the Super Bowl or to upload a song by a popular artist in the weeks after the artist releases the song. Thus, pre-processing module 204 may be configured to quickly recognize these specific protected content files 32. Depending on the configuration of transcoder 18 and system 10 generally, system 10 may then perform higher-level signature analysis of the relevant file to confirm the match and/or initiate a remedial action.

Decoding module 206 decodes the received content file from an initial codec. Decoding module 206 may have access to decoding information for a number of different codecs and, as a result, decoding module 206 may be capable of decoding submitted content files 30 encoded using any of several different codecs. Decoding module 206 may use filename extensions, data provided by content management server 16, and/or any other appropriate information to determine an appropriate codec to use in decoding the requested content. After decoding the received content file, decoding module 206 transmits the raw content to first-level signature modules 208.

First-level signature modules 208 each receive raw content from decoding module 206 and generate a first-level signature (such as a first-level submitted signature 34 or a first-level protected signature 36) from the raw content. As noted above, in particular embodiments, the algorithms utilized by first-level signature modules 208 may represent lightweight content signatures that can be quickly generated with little use of processing resources. First-level signature modules 208 then transmit these first-level signatures to signature server 20 for use in first-level signature analysis. Although FIG. 3 illustrates an embodiment of transcoder 18 in which first-level signature modules 208 all generate first-level signatures based on decoded content, in particular embodiments, one or more first-level signature modules 208 may generate first-level signatures using encoded content.

Second-level signature module 210 receives raw content from decoding module 206 or first-level signature modules 208 and generates a second-level signature based on the received raw content. As noted above, in particular embodiments, second-level signature module 210 utilizes an algorithm that is more time- or resource-intense than the algorithms utilized by first-level signature modules 208. Additionally, in particular embodiments, second-level signature module 210 may generate a signature that represents a portion of the raw content from the received content file itself. For example, second-level signature module 210 may generate a thumbnail (such as a submitted thumbnail 38 or a protected thumbnail 40) representing one or more frames of the received content file. Moreover, in particular embodiments, these thumbnails may represent a time-average of multiple frames of the received content file. Second-level signature module 210 may then transmit these second-level signatures to signature server 20 for use in second-level signature analysis.

In particular embodiments, second-level signature generation is only initiated at the request of signature server 20. As a result, in such embodiments, if signature server 20 determines based on first-level signature analysis that signature server 20 does not need to perform second-level signature analysis on a particular content file, raw content from that content file may bypass second-level signature module 210 or pass through second-level signature module 210 without triggering the generation of a second-level signature. Thus, second-level signature module 210 may receive requests, instructions, and/or other forms of control signals from signature server 20 instructing second-level signature module 210 to generate a second-level signature.

Encoding module 212 receives the raw content from decoding module 206, first-level signature modules 208, and/or second-level signature module 210. Encoding module 212 may encode the received raw content in a format appropriate for storage on submitted content store 22 or elsewhere on system 10. Alternatively, encoding module 212 may encode the received raw content in a format appropriate for transmission to or display by a particular client 12. Depending on the configuration and capabilities of transcoder 18, encoding module 212 can be configured to support any number of codecs, and encoding module 212 can utilize information provided by client 12, content management server 16, or any other suitable component of system 10 to determine an appropriate codec to use in encoding the requested content. After encoding the requested content, encoding module 212 transmits the encoded content to network interface module 200 for transmission to submitted content store 22 or a requesting client 12.

Additionally, in transcoders 18 that are responsible for processing submitted content files 30, encoding module 212 may receive instructions from signature server 20 indicating whether encoding module 212 is permitted to store a particular submitted content file 30 on submitted content store 22 and/or transmit a particular submitted content file 30 to a requesting client 12. As a result, encoding module 212 may, depending on the remedial actions signature server 20 is configured to initiate, discard encoded content from a particular submitted content file 30 if signature server 20 indicates to transcoder 18 that the relevant submitted content file 30 comprises protected content.

Furthermore, for transcoders 18 responsible for processing protected content files 32, there may be no need to encode raw content from protected content files 32 after first-level signature modules 208 have generated the corresponding first-level protected signatures 36. As a result, in such embodiments, encoding module 212 may be configured to discard the raw content received by encoding module 212 from protected content files 32. For similar reasons, encoding module 212 may be omitted entirely from transcoders 18 committed to full-time processing of protected content files 32.

In addition, although FIG. 3 illustrates, for the sake of simplicity, an example embodiment of transcoder 18 that includes only a single datapath, transcoder 18 may be configured to include any appropriate number of datapaths. As a result, transcoder 18 may include multiple instantiations of pre-processing module 204, decoding module 206, the set of first-level signature modules 208, second-level signature module 210, and enhancing module 212. Additionally, in such embodiments, transcoder 18 may also include such components as a load balancer and/or multiplexer to divide incoming traffic between the various datapaths and to consolidate the output of the various datapaths for transmission across system 10.

Figure 4:
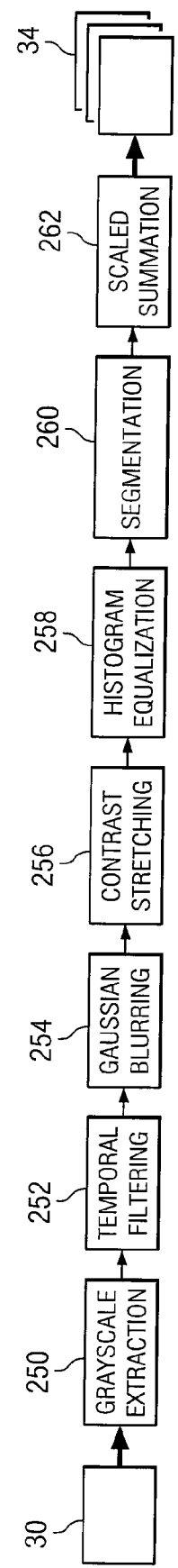
FIG. 4 is a flowchart illustrating an example operation of the transcoder in generating a content signature in accordance with a particular embodiment.

FIG. 4 is a flowchart illustrating the process by which a particular type of first-level signature is made in a particular embodiment of a first-level signature module 208. In particular, the illustrated technique produces a signature or signatures based on grayscale value associated with the relevant content file, such as a submitted content file 30 (as shown) or a protected content file 32. The steps illustrated in FIG. 4 may be combined, modified, or deleted where appropriate. Additional steps may also be added to the example operation. Furthermore, the described steps may be performed in any suitable order.

In this example, signature-generation begins at step 250 with grayscale extraction of the received video content input. Grayscale extraction generates a grayscale version of each frame in the received video content that may be used by the remainder of the algorithm. This may eliminate the effect of color on the remaining algorithm and reduce a user's ability to manipulate the colors of protected video content to avoid detection.

First-level signature module 208 then temporally filters the grayscale content at step 252. As a result, signature module 208 may generate a time-average of a sequential group of video frames in the grayscale-extracted content. The remainder of the algorithm may then be applied to this time-averaged, or "temporally blurred," frame. As a result, first-level signature module 208 may also prevent time-shifting from undermining the ability of system 10 to detect protected content.

Additionally, as part of temporally filtering the received content, first-level signature module 208 may also detect rapid pans or other visual effects that may suggest a massive change in the view. This may allow the temporal filter algorithm to detect scene changes and reset at a point in the video content where a stable scene is detected. Furthermore, in particular embodiments, the temporal filter algorithm may produce temporal-deviation indicators that indicate whether the output of the temporal filtering algorithm is producing a consistent output before allowing the output to be processed further. Inconsistent frames may then be discarded to reduce erroneous results.

The series time-averaged frame produced by the temporal filtering may then be normalized to reduce or eliminate various properties that might hinder signature analysis, as shown in FIG. 4 at steps 254-258. The steps completed during normalization may vary depending on the type of media being analyzed, expected user-modifications, and any other appropriate considerations.

For example, in the illustrated example, first-level signature module 208 normalizes received content by performing a Gaussian blur on the time-averaged frames at step 254. In particular embodiments, this Gaussian blur reduces the sharpness of details. As a result, the Gaussian blur may reduce the impact that signal noise in the submitted content (whether introduced intentionally or unintentionally) has on signature analysis.

In the illustrated example, after performing a Gaussian blur on time-averaged frames, first-level signature module 208 may then perform a contrast stretch at step 256. As part of performing this contrast stretch, first-level signature module 208 may increase the range of contrast present in the time-averaged frame to encompass the entire range recognizable within the relevant video format. This may improve image contrast, making images within the time-averaged frames easier to detect.

Then, after performing the contrast stretch, first-level signature module 208, in the illustrated example, performs a histogram equalization at step 258. Histogram equalization may increase the local contrast of images, allowing areas of lower local contrast to gain a higher contrast without affecting the global contrast. As a result, histogram equalization increases the relative contrast between neighboring regions with similar contrast level. This may further improve image detection and analysis.

After normalization is complete, first-level signature module 208 may then perform segmentation on the normalized frames at step 260. As a result of this segmentation, the normalized frames may be divided into multiple portions. This may result in individual images within the view of the frames being separated into multiple regions. Characteristics of each of these regions may then be extracted to form one or more separate signatures.

At step 262, first-level signature module 208 completes the generation of this particular first-level signature by performing a scaled summation of the grayscale values of the various segments generated in step 260. This summation may result in one or more first-level signatures that may be used as part of the first-level signature analysis described above with respect to FIG. 1.

Thus, FIG. 4 shows, for purposes of illustration, the steps completed in generating one specific example of a first-level signature. Nonetheless, as noted above, first-level signatures may describe or represent any appropriate characteristic or characteristics of the relevant content file. As a result, first-level signatures may be generated using any appropriate technique suitable to generate a signature of the type utilized in the relevant embodiment of system 10.

Figure 5:
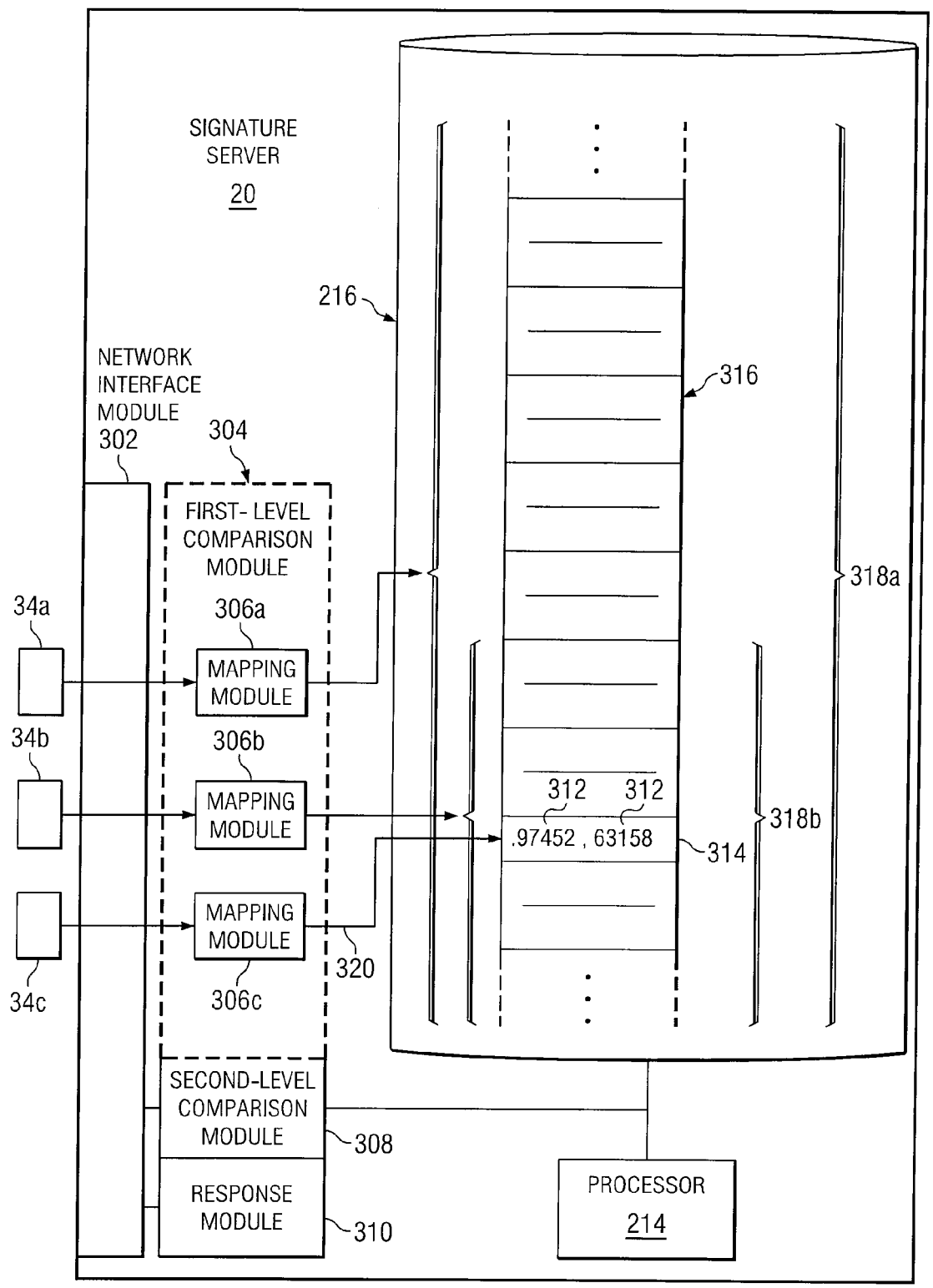
FIG. 5 illustrates in further detail a signature server that may be included in particular embodiments of the content-delivery system.

FIG. 5 illustrates the content and operation of a particular embodiment of signature server 20 that may be utilized in system 10. As illustrated in FIG. 5, signature server 20 includes the processor 214, memory 216, a network interface module 302, a first-level comparison module 304, a second-level comparison module 308, and response module 310. By selectively utilizing first-level comparison module 304 and second-level comparison module 308 to analyze content signatures for submitted content files 30, particular embodiments of signature server 20 can identify protected content in an efficient manner with respect to both time and processing capacity.

Processor 214 and memory 216 represent components similar in structure and operation to like-numbered elements of FIG. 3. Additionally, although FIG. 5 illustrates a particular embodiment of signature server 20 that includes only a single processor 214, particular embodiments of signature server 20 may include any number of processors 214 configured to share processing tasks with in signature server 20. Similarly, although shown as a single functional element in FIG. 5, memory 216 may include one or more memory devices local to and specifically associated with components or modules of signature server 20.

Network interface module 302 facilitates communication between signature server 20 and transcoders 18, content management server 16, and/or other components of system 10. In particular embodiments, network interface module 302 includes or represents one or more network interface cards (NICs). To support multiple simultaneous content flows, network interface module 302 may include multiple ports through which network interface module 302 can receive/transmit multiple flows simultaneously.

First-level comparison module 304 compares first-level submitted signatures 34 generated from a particular submitted content file 30 to first-level protected signatures 36 generated from protected content files 32 to make a rough determination of whether submitted content file 30 represents or includes protected content. In the illustrated embodiment, first-level comparison module 304 includes a plurality of mapping modules 306a-c, and first-level comparison module 304 performs the comparison by mapping first-level submitted signatures 34 to locations in memory 216 where information regarding matching first-level protected signatures 36 is stored. More generally, however, first-level comparison module 304 may perform the comparison in any appropriate manner based on the type of content signatures used, the configuration and capabilities of signature server 20, and the content files being compared. Additionally, in particular embodiments, first-level signature comparison may be performed by dedicated resources and, thus, first-level comparison module 304 may represent components external to signature server 20.

Mapping modules 306 map content signatures received by signature server 20 to one or more memory locations. In particular embodiments, each mapping module 306 is associated with a particular first-level signature algorithm and capable of mapping first-level signatures generated using the associated algorithm to appropriate memory locations. As described in greater detail below, mapping modules 306 may collectively identify a location in memory to associate with each protected content files 32 received by system 10, and signature server 20 may then compare submitted content file 30 to protected content files 32 by mapping submitted content file 30 to the same addresses. Although FIG. 5 illustrates a particular embodiment of signature server 20 that includes a particular number of mapping modules 306, alternative embodiments of signature server 20 may include any appropriate number of mapping modules 306 suitable to map the various different types of first-level signatures 30 utilized by system 10.

Second-level comparison module 308 compares second-level signatures generated from submitted content file 30 to second-level signatures generated from protected content files 32 to make a more accurate determination of whether submitted content file 30 represents or includes protected content. In particular embodiments, second-level comparison module 308 performs this second-level comparison only after first-level comparison 304 determines that submitted content file 30 is sufficiently similar to one or more protected content files 32 to warrant further analysis. In particular embodiments, the second-level comparison involves a more rigorous and/or time-consuming comparison of the features of submitted content file 30 and one or more protected content files 32. For example, in particular embodiments, second-level comparison module 308 may perform a pixel-by-pixel comparison of a frame of submitted content file 30 and a frame of one or more protected content files 32. More generally, however, second-level comparison module 308 may perform the comparison in any appropriate manner based on the type of content signatures used, the configuration and capabilities of signature server 20, and the content files being compared. Additionally, in particular embodiments, second-level signature comparison may be performed by dedicated resources and, thus, second-level comparison module 308 may represent components external to signature server 20.

Response module 310 initiates remedial action in response to signature server 20 determining that a submitted content files 30 match one or more protected content files 32 recognized by system 10. Additionally, in particular embodiments, response module 310 may initiate appropriate actions in response to determining that a particular submitted content file 30 does not match any protected content files 32, such as instructing an appropriate transcoder 18 that transcoder 18 can upload the relevant submitted content file 30. As a result, response module 310 may, in particular embodiments, include appropriate software and/or hardware to communicate information or instructions to other elements of signature server 20 through network interface module 302.

In general, network interface module 302, first-level comparison module 304, mapping modules 306, second-level comparison module 308, and response module 310 may each comprise any appropriate combination of hardware, software, and/or encoded logic suitable to provide the described functionality. Additionally, any two or more of the described modules may represent or include, in part or in whole, shared components. As one example, in particular embodiments, each of the modules represents, in part, a software process running on processor 214 as a result of processor 214 executing processor instructions stored in memory 216 and/or other computer-readable media accessible by signature server 20.

In operation, signature server 20 receives various signatures generated by transcoders 18 (such as transcoders 18e-g) based on protected content files 32 received by system 10. In particular embodiments, these signatures include one or more first-level protected signatures 36 for each protected content files 32 with each first-level protected signature 36 being generated by a different signature generation technique. These signatures may also include one or more second-level protected signature, such as protected thumbnail 40, that includes additional information regarding the associated protected content file 32.

Signature server 20 may then store first-level protected signatures 36 in protected signature store 24 and protected thumbnails 40 in protected thumbnail store 26. In particular embodiments, signature server 20 may additionally utilize the mapping modules 306 of first-level comparison module 204 to map the first-level protected signatures 36 for each protected content file 32 to a memory location to be associated with that protected content file 32. This process is described in further detail below with respect to the processing of first-level submitted signatures 34.

After successfully mapping the first-level signatures for a particular protected content file 32 to a memory address, first-level comparison module 204 may store information in the mapped memory address to indicate that first-level signatures for a protected content files 32 map to that memory address. For example, in particular embodiments, first-level comparison module 304 may store a file identifier 312 for the relevant protected content files 32 in the mapped memory address. File identifier 312 may represent any appropriate information identifying the relevant protected content file 32. Examples of file identifier 312 include, but are not limited to, a file name or storage location for the protected content file 32 that mapped to that memory address 314, a link to a storage location for that protected content file 32, a file name or storage location for a second-level signature associated with that protected content file 32, a link to the relevant second-level signature, and/or any other information identifying the relevant protected content file 32 or its associated content signatures. As a result, in particular embodiments, signature server 20 may build a map space 316 of memory locations in memory 216 that include all memory locations to which the first-level signatures associated with any of the received protected content files 32 map.

After receiving content signatures for one or more protected content files 32, signature server 20 may begin signature analysis of submitted content files 30. As part of this process, signature server 20 may receive first-level signatures for a particular submitted content file 30 from one of transcoders 18. In response to receiving first-level submitted signatures 34, signature server 20 initiates first-level signature analysis using first-level comparison module 304.

More specifically, in the illustrated example, signature server 20 receives first-level submitted signatures 34*a*-*c* associated with a particular submitted content file 30 from a transcoder 18 or other appropriate element of system 10. After receiving first-level submitted signatures 34 from transcoders 18, first-level comparison module 304 compares the first-level submitted signatures 34 to corresponding first-level signatures for each of the protected content files 32 recognized by system 10. Based on this comparison, signature server 20 determines whether to proceed with second-level signature analysis.

In particular embodiments, such as the one shown in FIG. 5, first-level comparison module 304 may include a plurality of mapping modules 306 each associated with a particular signature algorithm and capable of mapping first-level submitted signatures 34 generated with the associated signature algorithm to an address or range of addresses in memory 216. For example, in particular embodiments, one of the first-level signature algorithms utilized by transcoders 18 may generate a chroma value for various portions of a selected frame of submitted content file 30 and then sum these chroma values to generate a first-level submitted signature based on these chroma values. A mapping module 306 associated with this chroma-based signature algorithm may then map the most-significant digits of this sum to a range of addresses in memory 216. As a result, by successively mapping all of the first-level submitted signatures 34 to an increasingly smaller sub-range of addresses and, ultimately, to one or more final addresses, signature server 20 may determine, based on the content of the final addresses, whether submitted content file 30 matches any of the protected content files 32 already processed by signature server 20.

For instance, in the illustrated example, signature server 20 receives a plurality of two-bit first-level submitted signatures 34 associated with submitted content file 30. During first-level signature analysis, a first mapping module 306 (represented in FIG. 5 by mapping module 306*a*) maps a first-level submitted signature 34*a* associated with submitted content file 30 to a range of addresses in memory 216 (represented by bracket 318*a*). A second mapping module (mapping module 306*b*) may then map first-level submitted signature 34*b* to a sub-range range of addresses (represented by bracket 318*b*) within the address range identified by mapping module 306*a*. A third mapping (mapping module 306*c*) may then map first-level submitted signature 34*c* to a final memory address 314 (or final range of addresses) within memory 316 (represented by arrow 320). Signature server 20 then determines whether any information is stored in memory address 314. If not, signature server 20 determines that submitted content file 30 does not match any of the protected content files 32 recognized by signature server 20. As a result, response module 310 may, in particular embodiments, notify a particular transcoder 18 that transcoder 18 is permitted to upload submitted content file 30 to submitted content store 22 and/or perform another requested operation with respect to submitted content file 30.

If, instead, first-level comparison module 304 determines that information is stored in final memory address 314, first-level comparison module 304 determines that first-level signatures for submitted content file 30 match first-level signatures for one or more protected content files 32. In particular embodiments, first-level comparison module 304 may additionally determine the identity of the matched protected content files 32 based on file identifiers 312 stored in final memory address 314. Furthermore, in response to determining that first-level signatures of submitted content file 30 match first-level signatures of one or more protected content files 32, signature server 20 may initiate second-level signature analysis to perform a more detailed comparison of submitted content file 30 and protected content files 32.

As part of performing second-level signature analysis, signature server 20 may request second-level signatures for submitted content file 30 from one of transcoders 18. In response, an appropriate transcoder 18 may transmit second-level signatures for submitted content file 30 to signature server 20. Additionally, signature server 20 may retrieve second-level signatures for protected content files 32 from protected thumbnail store 26 or other locations within system 10. In particular embodiments, signature server 20 may only retrieve second-level signatures for protected content files 32 that matched submitted content file 30 during first-level signature analysis. For example, signature server 20 may utilize file identifiers 312 stored at the memory address 314 identified during first-level signature analysis to retrieve specific protected thumbnails 40 from protected thumbnail storage 24.

In particular embodiments, signature server 20 may map a second-level signature for submitted content file 30 (such as a submitted thumbnail 38) to a memory location in a similar fashion to that described for first-level signature analysis. As a result, in such embodiments, signature server 20 may include a second-level signature mapping module (not shown) to map the second-level signature for submitted content file 30 to an address in memory 214. Signature server 20 may store, at a particular memory address, file identifiers 312 for protected content files 32 whose second-level signatures also map to that address. Alternatively, signature server 20 may do a bit-by-bit comparison of the second-level signature for submitted content file 30 to the second-level signatures for all matching protected files 32 identified during first-level signature analysis. More generally, however, signature server 20 may compare the second-level signatures of submitted content file 30 with the second-level signatures of the relevant protected content files 32 in any appropriate manner based on the configuration and capabilities of signature server 20.

If signature server 20 determines that the second-level signature of submitted content file 30 does not match the second-level signatures of any of the protected content files 32 identified during first-level signature analysis, signature server 20 determines that submitted content file 30 does not match any of the protected content files 32 recognized by signature server 20. As a result, response module 310 may, in particular embodiments, notify content an appropriate transcoder 18 that the relevant transcoder 18 is permitted to upload submitted content file 30 to submitted content store 22 and/or perform another requested operation with respect to submitted content file 30.

If, instead, signature server 20 determines that the second-level signature of submitted content file 30 matches the second-level signatures of one or more protected content files 32, signature server 20 may instruct response module 310 to initiate one or more remedial actions. As noted above, these remedial actions may represent any appropriate action executed, initiated, or induced by signature server 20 to limit or prevent use or misuse of the relevant protected content. In particular embodiments, remedial actions taken by signature server 20 may prevent submitted content file 30 from being uploaded to submitted content store 22 or subsequently downloaded from submitted content store 22, notify users or human operator 42 that submitted content file 30 comprises protected content, or otherwise modify the manner in which submitted content file 30 is stored on or transmitted within system 10.

As one example, response module 310 may refuse a request to upload submitted content file or instruct content management server 16 to do so. For example, if the signature server 20 determines that second-level signature for submitted content file 30 matches the second-level signature for one or more protected content files 32, response module 310 may inform (e.g., via an HTTP response or email message) a user attempting to upload submitted content file 30 that submitted content file 30 will not be uploaded. Alternatively, response module 310 may instruct content management server 16 to refuse the upload request and to inform the relevant user.

As another example, response module 310 may generate an email message identifying submitted content file 30 and indicating that submitted content file 30 appears to represent or include protected content. Response module 310 may then transmit the email to a user attempting to upload or download submitted content file 30 and request that user to contact an operator of system 10 (such as human operator 42) to confirm that submitted content file does not represent or include protected content. Additionally or alternatively, response module 310 may transmit the email message to human operator 42 and request that human operator 42 verify that submitted content file 30 does not, in fact, represent or include protected content. In addition, in particular embodiments, response module 310 may include all or a portion of submitted content file 30 and/or any matched protected content files 32 to facilitate review by operator 42. For example, response module 310 may include a thumbnail of one or more frames each of submitted content file 30 and the matched protected content files 32.

As yet another example, signature server 20 may log information about a user attempting to upload, download, or otherwise use submitted content file 30, such as a user name or internet protocol (IP) address. Because such behavior may violate a user agreement associated with a particular embodiment of system 10, signature server 20 may monitor and record usage of protected content files 32. An operator of system 10 may then take disciplinary action against the relevant user, such as terminating the user's account on system 10.

Thus, signature server 20 may provide a number of techniques for efficiently identifying protected content within submitted content files 30. In particular embodiments, signature server 20 may reduce the time and processing resources expended in identifying protected content by limiting the number of comparison performed during signature analysis. Additionally, particular embodiments of signature server may map content signatures to memory locations, which may also reduce the time and processing resources required to determine whether a particular submitted content file 30 matches any protected content files 32. As a result, particular embodiments of signature server 20 may provide several benefits. Specific embodiment may, however, provide some, none, or all of these benefits.

In addition, although the description above describes, for purposes of simplicity, an embodiment of signature server in which signature server 20 receives or generates each of first-level submitted signatures 34 once for submitted content file 30, first-level comparison module 304 may instead utilize signature algorithms that are applied to a single frame or other portion of submitted content file 30. In such embodiments, the described process may be repeated for multiple frames of a submitted content file 30. For example, first-level comparison module 304 may sample a frame of submitted content file 30 every five seconds, and perform first-level signature analysis on each of these sampled frames.

Additionally, instead of sampling a single frame at each sampling interval, first-level comparison module 304 may sample a time-averaged aggregation of multiple frames. As a result, in particular embodiments, first-level comparison module 304 may account for the possibility that any protected content in submitted content file 30 has been temporally shifted. For example, if a user attempts to upload a submitted content file 30 that includes a portion of a protected movie time-shifted by thirty (30) seconds, particular embodiments of system 10 may be capable of correctly identifying the time-shifted submitted content file 30 as containing protected content.

Furthermore, in such embodiments, signature server 20 may initiate second-level signature analysis only after matching first-level submitted signatures 34 for multiple frames of submitted content file 30 to corresponding signatures for multiple frames of protected content files 32. For example, signature server 20 may be configured to initiate second-level signature analysis only after matching a threshold number of frames from submitted content file 30 to frames of protected content files 32. As a result, first-level comparison module 304 may count the number of matches between first-level signatures of submitted content file 30 and protected content files 32, and second-level comparison module 308 may initiate second-level signature analysis only after first-level comparison module 304 has determined that more than a threshold number of frames have been matched.

Additionally, in particular embodiments, signature server 20 may be capable of adjusting this minimum threshold number to optimize the effectiveness of the signature analysis performed by signature server 20 and/or the system resources expended to perform that analysis. For example, signature server 20 may raise the minimum threshold if signature server 20 too frequently initiates second-level signature analysis for all submitted content files 30 or if signature server 20 too frequently initiates second-level signature analysis for submitted content files 30 that are ultimately determined not to comprise protected content. For example, in particular embodiments, signature server 20 may adjust the minimum threshold based on a number of false positive results generated by signature server 20 during a predetermined period of time. These false positive results may represent, or be estimated based upon, any appropriate indication that second-level signature analysis is being too frequently performed on submitted content files 30. The number of false positive results may be calculated or estimated based on the number of false positives actually generated from a sample set of requests (e.g., during quality-control testing), the number of remedial actions taken (e.g., the total number of download requests declined) over a predetermined time period, the number of times signature server 20 detects a match between a first-level submitted signature 34 and a first-level protected signature 36 over a predetermined time period, the number of complaints received from users regarding declined download requests, and/or any other indication that the first-level signature analysis performed by signature server 20 incorrectly suggested or predicted that the requested submitted content file 30 contained protected content. If the number of false positives generated during a specified period of time exceeds a predetermined maximum, signature server 20 may increase the threshold to reduce the frequency with which signature server 20 initiates second-level analysis.

By contrast, if it is determined that a significant number of submitted content files 30 that contain protected content are passing through first-level signature analysis undetected, this minimum threshold may be lowered to further limit the amount of protected content passing through signature analysis undetected. For example, in particular embodiments, signature server 20 may adjust the minimum threshold based on a number of false negative results generated by signature server 20 during a predetermined period of time. These false negative results may represent, or be estimated based upon, any appropriate indication that second-level signature analysis is not being performed frequently enough and/or too many submitted content files are being downloaded/uploaded without appropriate remedial actions being initiated. For example, the number of false negative results may be calculated or estimated based on the number of false negatives actually generated from a sample set of requests (e.g., during quality-control testing), the total number of remedial actions taken (e.g., the total number of download requests declined) over a predetermined time period, the number of times signature server 20 detects a match between a first-level submitted signature 34 and a first-level protected signature 36 over a predetermined time period, the number of complaints received from content owners regarding protected content being distributed on system 10, and/or any other indication that the first-level signature analysis performed by signature server 20 incorrectly suggested or predicted that the requested submitted content file 30 did not contain any protected content. If the number of false negatives generated during a specified period of time exceeds a predetermined maximum, signature server 20 may decrease the threshold to increase the frequency with which signature server 20 initiates second-level analysis. Thus, first-level comparison module 304 (or other appropriate components of signature server 20) may tune the minimum threshold to optimize both the amount of time and resources spent on second-level analysis and the frequency with which protected content escapes signature analysis undetected.

The minimum threshold may also be adjusted to maintain a particular level of network traffic. Thus, as the number of users that are active and/or currently uploading submitted content files 30 to system 10 increases, the minimum threshold may be increased. This may reduce the frequency with which system 10 initiates second-level analysis and, as a result, limit the amount of network traffic resulting from the exchange of second-level signatures between the various components responsible for generating and matching second-level signatures. Additionally, this may limit the frequency with which second-level analysis is initiated at times when the network is receiving a large number of upload/download requests from users to prevent a backlog of requests from forming. By contrast, as the number of users that are active and/or uploading/downloading submitted content files 30 to system 10 decreases, system 10 may devote additional network bandwidth to the exchange of second-level signatures between the relevant components by reducing this minimum threshold. As a result, signature analysis techniques can be also adjusted to optimize use of available network bandwidth.

Figure 6A:
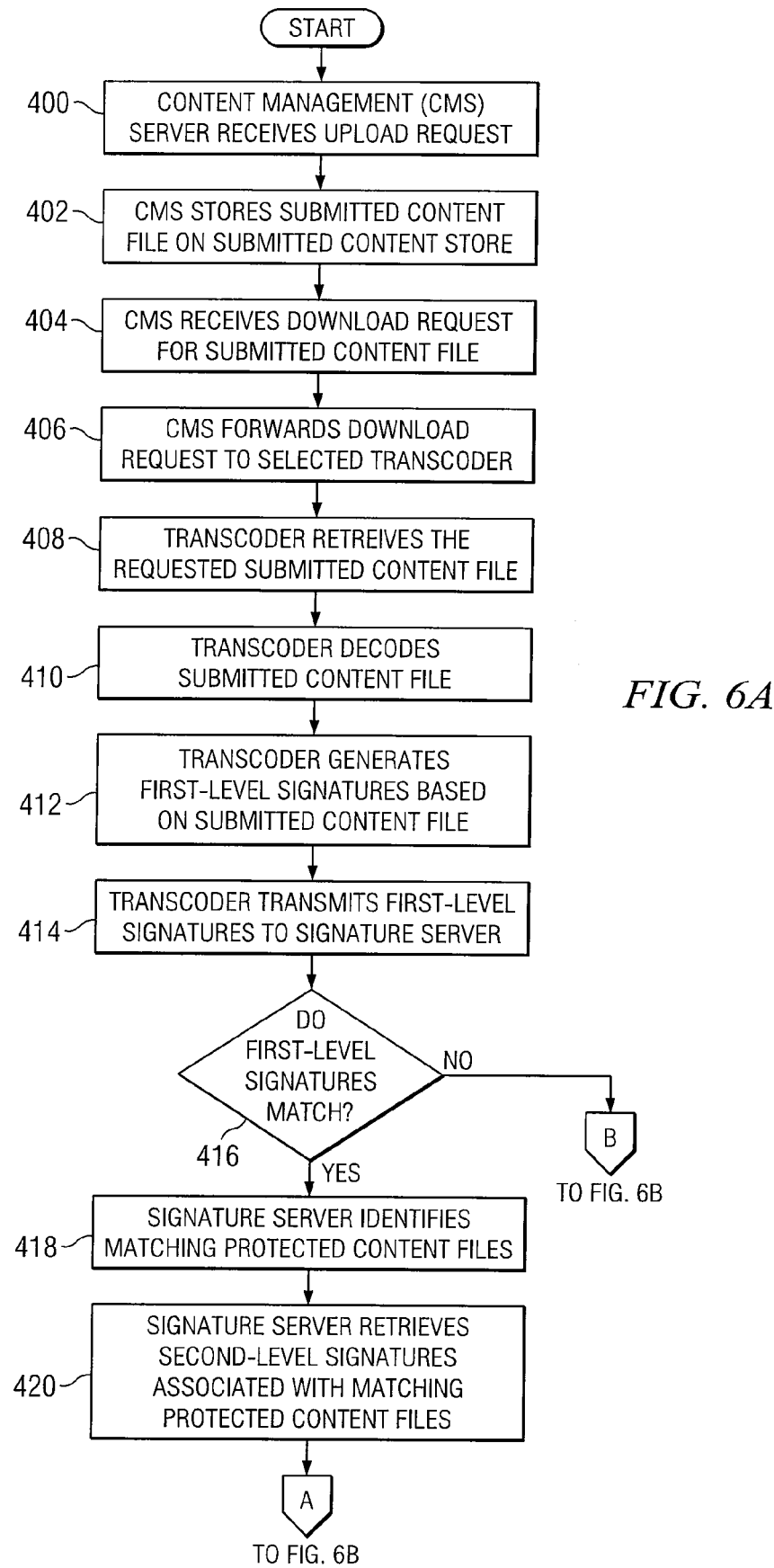
FIGS. 6A and 6B are a flowchart illustrating certain aspects of an example operation of the content-delivery system shown in FIG. 1.
Figure 6B:
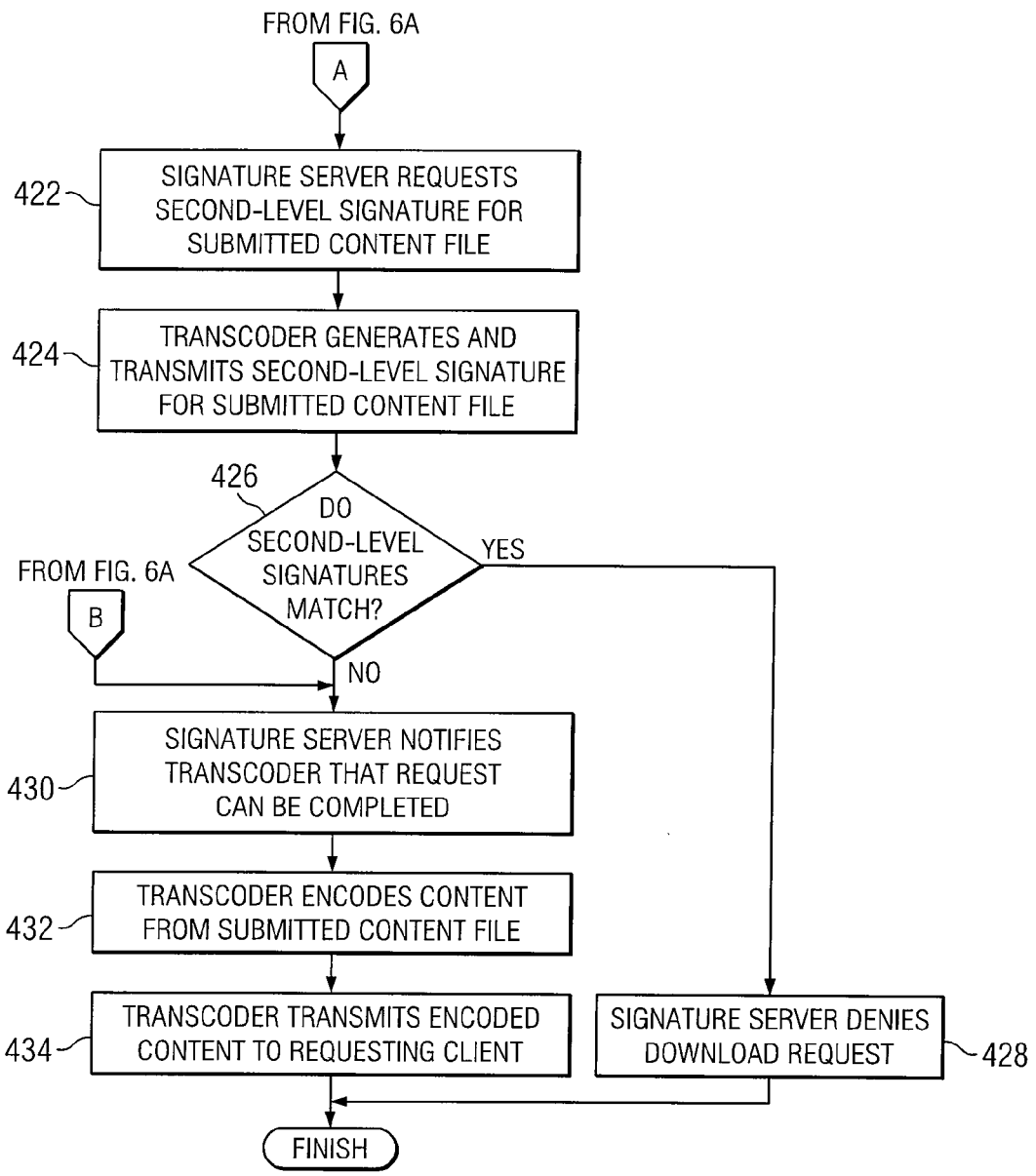

FIGS. 6A and 6B is a flowchart illustrating example operation of a particular embodiment of signature system 10 in determining whether a submitted content file 30 represents or includes protected content. Although the example focuses on a particular embodiment of system 10 in which transcoders 18 are responsible for generating all content signatures for submitted content files 30 and protected content files 32, in particular embodiments of system 10, signatures server 20 (or other appropriate components of system 10) may instead generate some or all content signatures used by signature server 20 during analysis. More generally, the steps illustrated in FIGS. 6A and 6B may be combined, modified, or deleted where appropriate. Additional steps may also be added to the example operation. Furthermore, the described steps may be performed in any suitable order without departing from the scope of the invention.

Operation begins at step 400 with content management server 16 receiving a request to upload a submitted content file 30. At step 402, content management server 16 stores submitted content file 30 on submitted content store 22. In particular embodiments, one or more transcoders 18 may transcode submitted content file 30 into a particular format (e.g., a commonly-requested encoding) before storing the submitted content file 30 on submitted content store 22. In alternative embodiments, content management server 16 may store submitted content file 30 in the same form and format as submitted content file 30 is received.

Users may then retrieve submitted content file 30 from submitted content store 22 by requesting the file from content management server 20. For example, in particular embodiments, a user may user a client 12 to transmit a download request (e.g., an HTTP request) over network 28 to content management server 16. This download request may identify submitted content file 30 or otherwise request download of submitted content file 30.

At step 404, content management server 16 receives the download request. Content management server 16, in particular embodiments, forwards the download request to a selected transcoder 18 or otherwise notifies the selected transcoder 18 of the request at step 406. The selected transcoder 18 may then retrieve the requested submitted content file 30 at step 408. In alternative embodiments, content management server 16 may itself retrieve the requested submitted content file 30 from submitted content store 22 and transmit submitted content file 30 to the selected transcoder 18.

At step 410, the selected transcoder 18 decodes submitted content file 30. The selected transcoder 18 then generates one or more first-level signatures based on submitted content file 30 at step 412. The first-level signature or signatures describe at least a first characteristic of submitted media file 30. Although, in the example described by FIGS. 6A and 6B, first-level signatures are generated from a decoded copy of submitted content file 30, in particular embodiments, some or all of first-level signatures may be generated from encoded content without decoding.

Transcoder 18 then transmits the first-level signatures for submitted content file 30 to signature server 20 at step 414. As discussed above, signature server 20 has access to a collection of first-level signatures for protected content files 32. Each of these stored first-level signatures describes a characteristic of a particular protected content file 32. Upon receiving the first-level signature of submitted content file 30, signature server 20 determines, at step 416, whether the first-level signatures of submitted content file 30 match the set of first-level signatures for any protected content files 32 stored on signature server 20. If not, signature server 20 permits submitted content file 30 to be downloaded with operation continuing at step 430.

If, instead, signature server 20 determines that the first-level signatures for submitted content file 30 match the first-level signatures for one or more protected content files 32, signature server 20 may identify the protected content files 32 having first-level signatures matching the first-level signatures of submitted content file 30 at step 418. For example, in particular embodiments, signature server 20 maps the first-level signatures for submitted content file 30 to a particular memory location. Information identifying protected content files 32 having first-level signatures that map to this memory location may be stored in the location. At step 420, signature server 20 retrieves second-level signatures associated with the identified protected content files 32 from protected signature store 24 or another storage location within system 10.

At step 422, signature server 20 requests that a second-level signature for submitted content file 30 be generated by the selected transcoder 18. In response, the selected transcoder 18 generates a second-level signature for submitted content file 30 and transmits the second-level signature to signature server 20 at step 424. The second-level signature describes at least a second characteristic of submitted content file 30. In particular embodiments, as noted above, the second-level signature may comprise a portion of submitted content file 30 itself, such as a thumbnail of submitted content file 30.

At step 426, signature server 20 determines whether the second-level signature of submitted content file 30 matches any of the second-level signatures for the identified protected content files 32. If signature server 20 determines that the second-level signature for submitted content file 30 does not match the second level-signature for any of the identified protected content files 32, signature server 20 permits submitted content file 30 to be uploaded with operation continuing at step 430.

If, instead, signature server 20 determines that the second-level signature for submitted content file 30 matches a second-level signature for one of the identified protected content files 32, signature server 20 initiates a remedial action. The remedial action may represent any appropriate action taken to prevent the submitted content file 30 from being used and/or misused on system 10. Examples of the remedial action that may be initiated by signature server 20 in particular embodiments include, but are not limited to, instructing content management server 16 to decline the request to download or store submitted content file 30, notifying the user that submitted content file 30 comprises protected content, and transmitting submitted content file 30 to a human operator for review. In the illustrated example, signature server 20 initiates a remedial action by denying the download request (or by instructing other components of system 10 to deny the download request) at step 428. In particular embodiments, signature server 20 may also take steps to ensure that submitted content file 30 is not accessed by subsequent requests, such as by removing submitted content file 30 from submitted content store 22, flagging submitted content file 30 as protected, and/or preventing submitted content file from being identified as a result in searches of submitted content store 22. Operation of signature server 20 may then end with respect to uploading submitted content file 30, as shown in FIGS. 6A and 6B.

If, however, signature server 20 determines, at step 416, that the first-level signature for submitted content file 30 doesn't match the first-level signature for any of protected content files 32 or if signature server 20 determines, at step 426, that the second-level signature for submitted content file 30 doesn't match the second-level signature for any of the matched protected content files 32, then signature server 20 may notify the relevant transcoder 18 that transcoder 18 can complete the download request at step 430. Transcoder 18 may then encode the raw content of submitted content file 30 in an appropriate format at step 432. As noted above, in particular embodiments, transcoder 18 may support multiple different formats and may encode submitted content file 30 in a different format than submitted content file 30 was encoded when stored in submitted content store 22. For example, at the outset of the described signature analysis, transcoder 18 may decode submitted content file 30 based on a first codec (e.g., a codec associated with the original encoding of submitted content file 30) and, after successfully completing the signature analysis, encode submitted content file 30 based on a second codec (e.g., a code suitable for transmission to or display by the requesting client 12). Transcoder 18 may then transmit the encoded submitted content file 30 to the requesting client 12 at step 434. Operation of signature server 20 may then end with respect to downloading submitted content file 30, as shown in FIGS. 6A and 6B.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for processing media files, comprising:
receiving a request to download a first media file, wherein the first media file comprises video data;
in response to receiving the request, generating a plurality of first signatures, each first signature describing a first characteristic of a frame of the video data contained in the first media file;
generating a second signature based on the first media file, wherein the second signature describes a second characteristic of the first media file;
determining a number of matches between the plurality of first signatures and a first plurality of stored signatures, wherein each stored signature of the first plurality of stored signatures describes a first characteristic of video data of a different media file;
in response to determining that the number of matches is greater than a pre-determined threshold value:
determining whether the second signature matches any of a second plurality of stored signatures, wherein each of the second plurality of stored signatures describes the second characteristic of a different media file; and
in response to determining that the second signature matches one or more of the second plurality of stored signatures, denying the request to download the first media file;
counting a number of requests to download media files that are denied during a predetermined period of time;
determining that the number of denied requests exceeds a predetermined maximum; and
in response to determining that the number of denied requests exceeds the predetermined maximum, increasing the threshold value.

2. A method for processing media files, comprising:
receiving a request to download a first media file, wherein the first media file comprises video data;
in response to receiving the request, generating a plurality of first signatures, each first signature describing a first characteristic of a frame of the video data contained in the first media file;
generating a second signature based on the first media file, wherein the second signature describes a second characteristic of the first media file;
determining a number of matches between the plurality of first signatures and a first plurality of stored signatures, wherein each stored signature of the first plurality of stored signatures describes a first characteristic of video data of a different media file;

in response to determining that the number of matches is greater than a pre-determined threshold value:
  determining whether the second signature matches any of a second plurality of stored signatures, wherein each of the second plurality of stored signatures describes the second characteristic of a different media file; and
  in response to determining that the second signature matches one or more of the second plurality of stored signatures, denying the request to download the first media file;
counting a number of stored signatures that are processed without being detected during a predetermined period of time;
determining that the number of undetected signatures exceeds a predetermined maximum; and
in response to determining that the number of undetected signatures exceeds the predetermined limit, decreasing the threshold value.

3. The method of claim 1, further comprising adjusting the threshold value based on a network traffic level.

4. The method of claim 1, wherein:
receiving the request to download the first media file comprises receiving an internet protocol (IP) packet from a remote device over a packet-based network, wherein the IP packet comprises a request to download the first media file; and further comprising:
transmitting the first media file to the remote device over the packet-based network in response to determining that none of the plurality of first signatures match any of the first plurality of stored signatures.

5. The method of claim 1, wherein generating the plurality of first signatures comprises:
decoding the video data included in the first media file based on a first codec;
generating first signatures that each describe a first characteristic of the decoded video data; and further comprising:
encoding the decoded video data based on a second codec based at least in part on the number of matches; and
transmitting the encoded video data to a remote device.

6. A system for processing media files, comprising:
a transcoder operable to:
  receive a request to download a first media file, wherein the first media file comprises video data;
  in response to receiving the request, generate a plurality of first signatures, each first signature describing a first characteristic of a frame of the video data contained in the first media file; and
  generate a second signature based on the first media file, wherein the second signature describes a second characteristic of the video data contained in the first media file; and
a signature server operable to:
  determine a number of matches between the plurality of first signatures and a first plurality of stored signatures, wherein each stored signature of the first plurality of stored signatures describes a first characteristic of video data of a different media file;
  in response to determining that the number of matches is greater than a pre-determined threshold:
    determine whether the second signature matches any of a second plurality of stored signatures, wherein each of the second plurality of stored signatures describes the second characteristic of a different media file; and
    in response to determining that the second signature matches one or more of the second plurality of stored signatures, deny the request to download the first media file;
  count a number of requests to download media files that are denied during a predetermined period of time;
  determine that the number of denied requests exceeds a predetermined maximum; and
  in response to determining that the number of denied requests exceeds the predetermined maximum, increase the threshold value.

7. A system for processing media files, comprising:
a transcoder operable to:
  receive a request to download a first media file, wherein the first media file comprises video data;
  in response to receiving the request, generate a plurality of first signatures, each first signature describing a first characteristic of a frame of the video data contained in the first media file; and
  generate a second signature based on the first media file, wherein the second signature describes a second characteristic of the video data contained in the first media file; and
a signature server operable to:
  determine a number of matches between the plurality of first signatures and a first plurality of stored signatures, wherein each stored signature of the first plurality of stored signatures describes a first characteristic of video data of a different media file;
  in response to determining that the number of matches is greater than a pre-determined threshold:
    determine whether the second signature matches any of a second plurality of stored signatures, wherein each of the second plurality of stored signatures describes the second characteristic of a different media file; and
    in response to determining that the second signature matches one or more of the second plurality of stored signatures, deny the request to download the first media file;
  count a number of stored signatures that are processed without being detected during a predetermined period of time;
  determine that the number of undetected signatures exceeds a predetermined maximum; and
  in response to determining that the number of undetected signatures exceeds the predetermined limit, decrease the threshold value.

8. The system of claim 6, wherein the signature server is further operable to adjust the threshold value based on a network traffic level.

9. The system of claim 6, wherein:
the transcoder is operable to receive the request to download the first media file by receiving an internet protocol (IP) packet from a remote device over a packet-based network, wherein the IP packet comprises a request to download the first media file; and
the signature server is further operable to transmit the first media file to the remote device over the packet-based network in response to determining that none of the plurality of first signatures match any of the first plurality of stored signatures.

10. The system of claim 6, wherein the transcoder is operable to generate the plurality of first signatures by:
decoding the video data included in the first media file based on a first codec;

generating first signatures that each describe a first characteristic of the decoded video data; and wherein the transcoder is further operable to:
encode the decoded video data based on a second codec based at least in part on the number of matches; and
transmit the encoded video data to a remote device.

11. Logic encoded on a non-transitory computer-readable medium, the logic comprising code operable, when executed, to:
receive a request to download a first media file, wherein the first media file comprises video data;
in response to receiving the request, generate a plurality of first signatures, each first signature describing a first characteristic of a frame of the video data contained in the first media file;
generate a second signature based on the first media file, wherein the second signature describes a second characteristic of the first media file;
determine a number of matches between the plurality of first signatures and a first plurality of stored signatures, wherein each stored signature of the first plurality of stored signatures describes a first characteristic of video data of a different media file;
in response to determining that the number of matches is greater than a pre-determined threshold value:
determine whether the second signature matches any of a second plurality of stored signatures, wherein each of the second plurality of stored signatures describes the second characteristic of a different media file; and
in response to determining that the second signature matches one or more of the second plurality of stored signatures, deny the request to download the first media file;
count a number of requests to download media files that are denied during a predetermined period of time;
determine that the number of denied requests exceeds a predetermined maximum; and
in response to determining that the number of denied requests exceeds the predetermined maximum, increase the threshold value.

12. Logic encoded on a non-transitory computer-readable medium, the logic comprising code operable, when executed, to:
receive a request to download a first media file, wherein the first media file comprises video data;
in response to receiving the request, generate a plurality of first signatures, each first signature describing a first characteristic of a frame of the video data contained in the first media file;
generate a second signature based on the first media file, wherein the second signature describes a second characteristic of the first media file;
determine a number of matches between the plurality of first signatures and a first plurality of stored signatures, wherein each stored signature of the first plurality of stored signatures describes a first characteristic of video data of a different media file;
in response to determining that the number of matches is greater than a pre-determined threshold value:
determine whether the second signature matches any of a second plurality of stored signatures, wherein each of the second plurality of stored signatures describes the second characteristic of a different media file; and
in response to determining that the second signature matches one or more of the second plurality of stored signatures, deny the request to download the first media file;
count a number of stored signatures that are processed without being detected during a predetermined period of time;
determine that the number of undetected signatures exceeds a predetermined maximum; and
in response to determining that the number of undetected signatures exceeds the predetermined limit, decrease the threshold value.

13. The logic of claim 11, wherein the code is further operable to adjust the threshold value based on a network traffic level.

14. The logic of claim 11, wherein the code is operable to:
receive the request to download the first media file by receiving an internet protocol (IP) packet from a remote device over a packet-based network, wherein the IP packet comprises a request to download the first media file; and the code is further operable to transmit the first media file to the remote device over the packet-based network in response to determining that none of the plurality of first signatures match any of the first plurality of stored signatures.

* * * * *